United States Patent [19]
Wada et al.

[11] Patent Number: 5,729,723
[45] Date of Patent: Mar. 17, 1998

[54] DATA PROCESSING UNIT

[75] Inventors: Hideo Wada; Katsumi Takeda, both of Hadano; Yasuhiro Inagami, Kodaira; Hiroaki Fujii, Hadano, all of Japan

[73] Assignee: Hitachi, Ltd., Tokyo, Japan

[21] Appl. No.: 275,347

[22] Filed: Jul. 15, 1994

Related U.S. Application Data

[63] Continuation-in-part of Ser. No. 162,252, Dec. 7, 1993, Pat. No. 5,581,721, and Ser. No. 977,298, Nov. 16, 1992, Pat. No. 5,438,669.

[30] Foreign Application Priority Data

Dec. 7, 1992 [JP] Japan ................. 4-326435
Jul. 16, 1993 [JP] Japan ................. 5-176886

[51] Int. Cl.⁶ ........................................ G06F 3/00
[52] U.S. Cl. ............. 395/563; 395/421.02; 395/421.05; 395/800
[58] Field of Search ................... 395/375, 800, 395/412, 700, 563, 421.02, 421.05

[56] References Cited

U.S. PATENT DOCUMENTS

| | | | |
|---|---|---|---|
| 4,340,932 | 7/1982 | Bakula et al. | 395/402 |
| 4,435,753 | 3/1984 | Rizzi | 395/700 |
| 5,111,389 | 5/1992 | McAuliffe et al. | 395/800 |
| 5,179,674 | 1/1993 | Williams et al. | 395/414 |
| 5,247,645 | 9/1993 | Mirza et al. | 395/405 |
| 5,278,963 | 1/1994 | Hattersley et al. | 395/414 |
| 5,367,651 | 11/1994 | Smith et al. | 395/700 |
| 5,388,235 | 2/1995 | Ikenaga et al. | 395/375 |
| 5,437,043 | 7/1995 | Fujii et al. | 395/800 |
| 5,438,669 | 8/1995 | Nakazawa et al. | 395/375 |

FOREIGN PATENT DOCUMENTS

| | | |
|---|---|---|
| A0476722 | 3/1992 | European Pat. Off. . |
| A0543366 | 5/1993 | European Pat. Off. . |

OTHER PUBLICATIONS

Structured Computer Organization, Andrew S. Tanenbaum. 1990 pp. 11–13.
Kateuenis Thesis 1984 pp. 138–145.
Proceedings Supercomputing '92, "Pseudo Vector Processor Based on Register–Windowed Superscalar Pipeline", N. Kisaburo, et al., Minneapolis, Minnesota, Nov. 16–20, 1992, IEEE Computer Society Press.
"Computer Architecture : A Quantitative Approach", Hennesy and D. A. Patterson, Morgan Kaufmann Publishers, Inc. (1990) pp. 450–454.
"Register Allocation for Software Pipelined Loops", B. R. Rau et al. ACM Sigplan 92, pp. 238–299.
"Parallelization of Loops with Exits on Pipelined Architectures", P. Tirumalai et al., Supercomputing, 1990, pp. 200–212.

Primary Examiner—Jack B. Harvey
Assistant Examiner—Paul R. Myers
Attorney, Agent, or Firm—Antonelli, Terry, Stout, & Kraus, LLP

[57] ABSTRACT

A data processing unit which can access a greater number of registers than registers addressable by an instruction to realize high-speed execution of a program. To this end, the data processing unit includes a greater number of floating point registers than the number of registers addressable by an ordinary instruction, a window start pointer register, a window start pointer valid register, a conversion circuit, when the window start pointer valid register has a value of 1, for converting a floating point register number in the instruction to a physical floating point register number and for changing a conversion pattern depending on the value of the window start pointer register, a window start pointer set instruction for setting a value at the window start pointer register, and floating point register pre-load and post-store instructions having a register field different in length from the ordinary instruction, and wherein the floating point register number specified by the register field is converted by the conversion circuit to the physical floating point register number on the basis of the value of the window start pointer register.

13 Claims, 12 Drawing Sheets

FIG. 2A WINDOW START POINTER SET INSTRUCTION

| INSTRUCTION CODE | UNUSED | u | v |
|---|---|---|---|

FIG. 2B FLOATING POINT REGISTER PRELOAD INSTRUCTION

| INSTRUCTION CODE | FR NO. | GR NO. | INCREMENT VALUE |
|---|---|---|---|

FIG. 2C FLOATING POINT REGISTER POSTSTORE INSTRUCTION

| INSTRUCTION CODE | FR NO. | GR NO. | INCREMENT VALUE |
|---|---|---|---|

(NOTE)  FR IS FLOATING POINT REGISTER
         GR IS GENERAL REGISTER

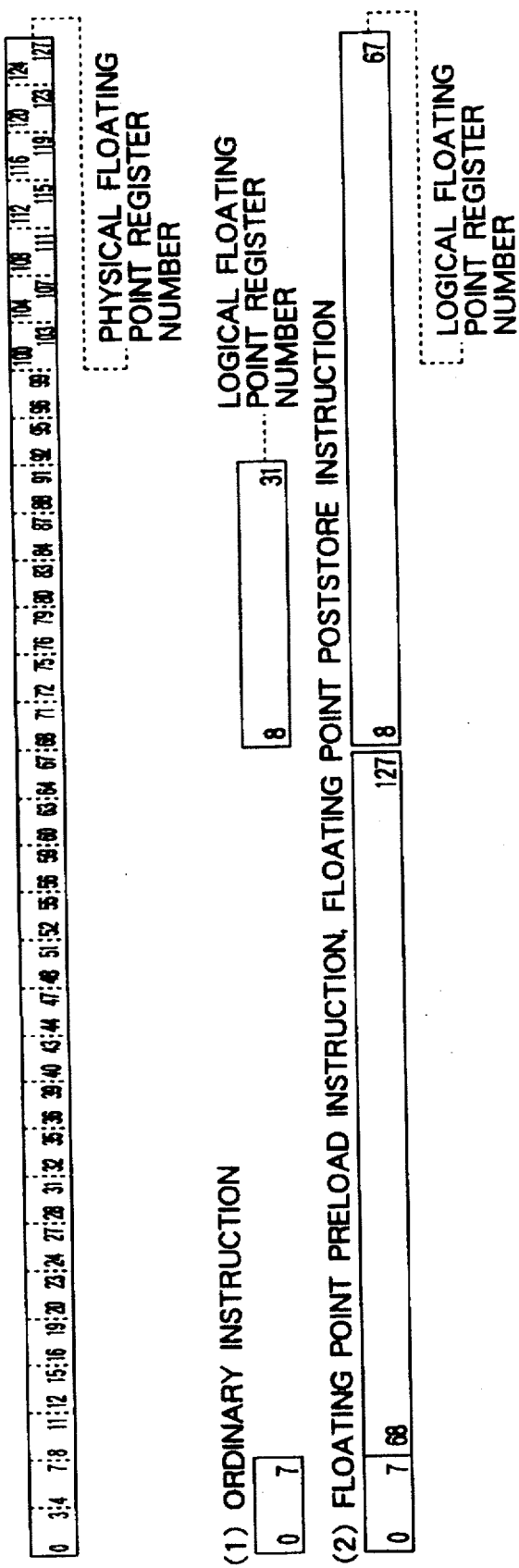

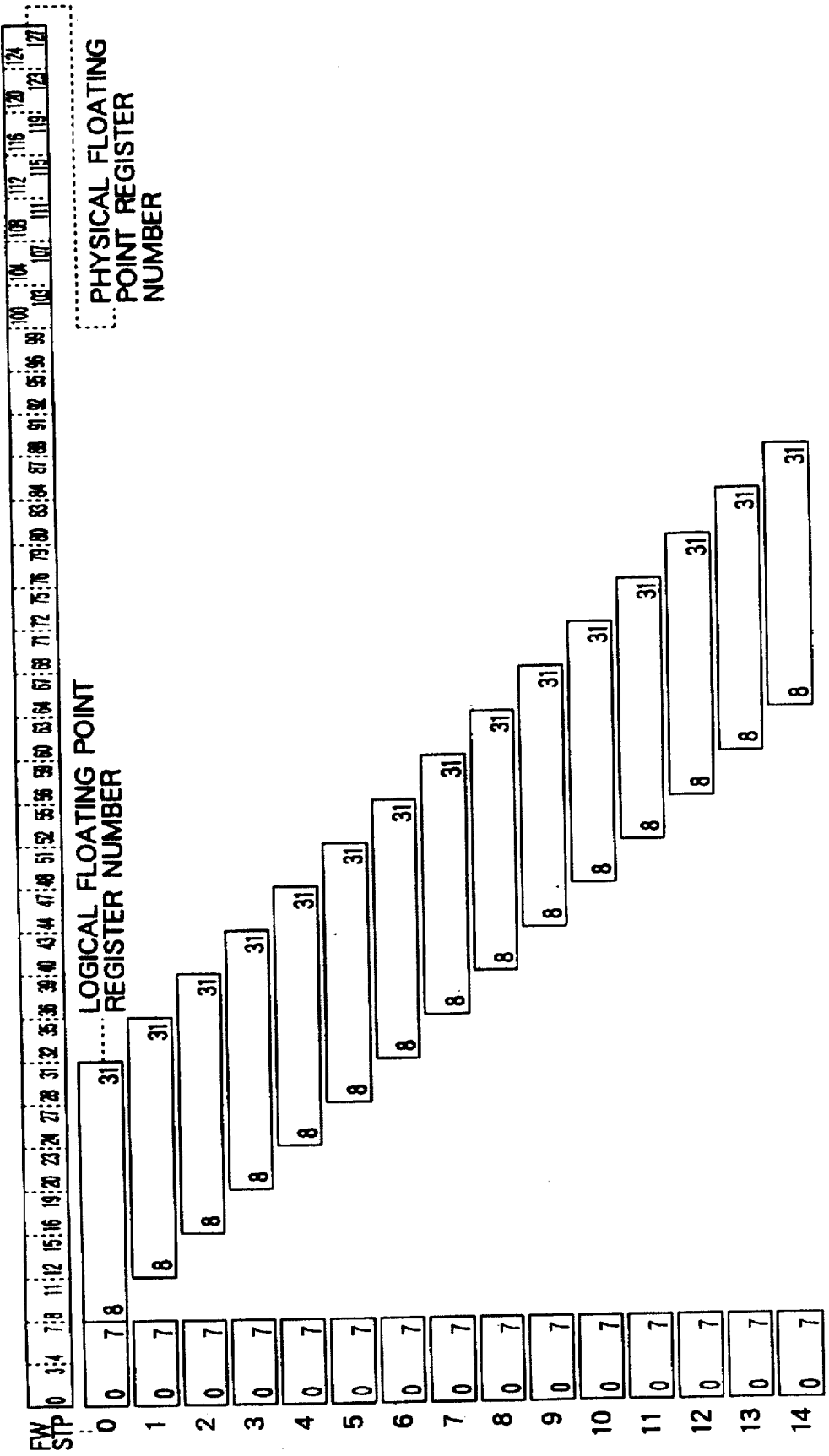

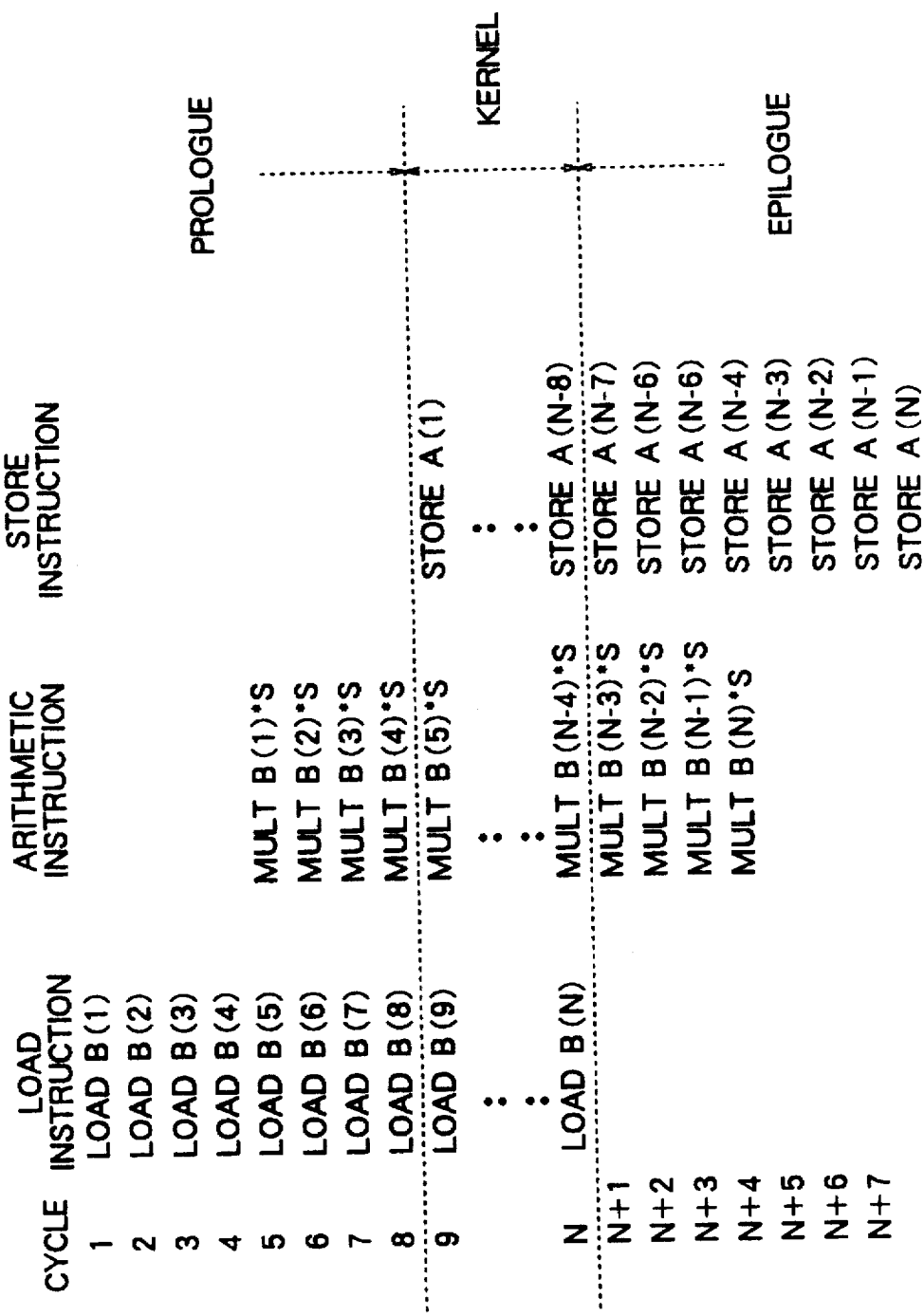

FIG. 9

| NO. | RELATIVE ADDRESS | INSTRUCTION STRING | OPERATION |
|---|---|---|---|
| 1 | | FWSTPS 0,0 | FWSTP=0 |
| 2 | | FLDPRM 8(GR1),FR8 | B(1)→PFR<0,18> |
| 3 | | FLDPRM 8(GR1),FR12 | B(2)→PFR<0,12>(=PFR<1,8>) |
| 4 | | FLDPRM 8(GR1),FR16 | B(3)→PFR<0,16>(=PFR<2,8>) |
| 5 | | FLDPRM 8(GR1),FR20 | B(4)→PFR<0,20>(=PFR<3,8>) |
| 6 | | FLDPRM 8(GR1),FR24 | B(5)→PFR<0,24>(=PFR<4,8>) |
| 7 | | FMLT FR10,FR8,FR7 | B(1)(PFR<0,8>)*S→PFR<0,10> |
| 8 | | FWSTPS 1,1 | FWSTP=1 |
| 9 | | FLDPRM 8(GR1),FR24 | B(6)→PFR<1,24>(=PFR<5,8>) |
| 10 | | FMLT FR10,FR8,FR7 | B(2)(PFR<1,8>)*S→PFR<1,10> |
| 11 | | FWSTPS 1,1 | FWSTP=2 |
| 12 | | FLDPRM 8(GR1),FR24 | B(7)→PFR<2,24>(=PFR<6,8>) |
| 13 | | FMLT FR10,FR8,FR7 | B(3)(PFR<2,8>)*S→PFR<2,10> |
| 14 | | FWSTPS 1,1 | FWSTP=3 |
| 15 | | FLDPRM 8(GR1),FR24 | B(8)→PFR<3,24>(=PFR<7,8>) |
| 16 | | FMLT FR10,FR8,FR7 | B(4)(PFR<3,8>)*S→PFR<3,10> |
| 17 | | FWSTPS 1,1 | FWSTP=4 |
| 18 | LOOP | FLDPRM 8(GR1),FR24 | B(i+8)→PFR<i+3(mod 30),24>(=PFR<i+7(mod 30),8>) |
| 19 | | FMLT FR10,FR8,FR7 | B(i+4)(PFR<i+3(mod 30),8>)*S→PFR<i+3(mod 30),10> |
| 20 | | FSTPOM 8(GR3),FR114 | PFR<i+3(mod 30),114>(=PFR<i-1(mod 30),10>)→A(i) |
| 21 | | FWSTPS 1,1 | FWSTP=FWSTP+1(=i+4) |
| 22 | | BCNT GR4,LOOP | IF i<N-8 THEN GO TO LOOP |
| 23 | | FMLT FR10,FR8,FR7 | B(N-3)(PFR<N-4(mod 30),8>)*S→PFR<N-4(mod 30),10> |
| 24 | | FSTPOM 8(GR3),FR114 | PFR<N-4(mod 30),114>(PFR<N-8(mod 30),10>)→A(N-7) |
| 25 | | FWSTPS 1,1 | FWSTP=FWSTP+1(=N-3) |

FIG. 10

| NO. | RELATIVE ADDRESS | INSTRUCTION STRING | | OPERATION |
|---|---|---|---|---|
| 26 | | FMLT | FR10,FR8,FR7 | B(N-2)×(PFR<N-3(mod 30),8>)*S→PFR<N-3(mod 30),10> |
| 27 | | FSTPOM | 8(GR3),FR114 | PFR<N-3,114>(PFR<N-7(mod 30),10>)→A(N-6) |
| 28 | | FWSTPS | 1,1 | FWSTP=FWSTP+1(=N-2) |
| 29 | | FMLT | FR10,FR8,FR7 | B(N-1)×(PFR<N-2(mod 30),8>)*S→PFR<N-2(mod 30),10> |
| 30 | | FSTPOM | 8(GR3),FR114 | PFR<N-2,114>(PFR<N-6(mod 30),10>)→A(N-5) |
| 31 | | FWSTPS | 1,1 | FWSTP=FWSTP+1(=N-1) |
| 32 | | FMLT | FR10,FR8,FR7 | B(N)×(PFR<N-1(mod 30),8>)*S→PFR<N-1(mod 30),10> |
| 33 | | FSTPOM | 8(GR3),FR114 | PFR<N-1,114>(PFR<N-5(mod 30),10>)→A(N-4) |
| 34 | | FWSTPS | 1,1 | FWSTP=FWSTP+1(=N) |
| 35 | | FSTPOM | 8(GR3),FR114 | PFR<N,114>(PFR<N-4(mod 30),10>)→A(N-3) |
| 36 | | FWSTPS | 1,1 | FWSTP=FWSTP+1(=N+1) |
| 37 | | FSTPOM | 8(GR3),FR114 | PFR<N+1,114>(PFR<N-3(mod 30),10>)→A(N-2) |
| 38 | | FWSTPS | 1,1 | FWSTP=FWSTP+1(=N+2) |
| 39 | | FSTPOM | 8(GR3),FR114 | PFR<N+2,114>(PFR<N-2(mod 30),10>)→A(N-1) |
| 40 | | FWSTPS | 1,1 | FWSTP=FWSTP+1(=N+3) |
| 41 | | FSTPOM | 8(GR3),FR114 | PFR<N+3,114>(PFR<N-1(mod 30),10>)→A(N) |

(NOTE) PFR REPRESENTS PHYSICAL FLOATING POINT REGISTER

FIG. 11

| NO. | RELATIVE ADDRESS | INSTRUCTION STRING | OPERATION |
|---|---|---|---|
| 1 | LOOP | FLDM 8(GR1),FR8 | 8-BYTE DATA IS READ OUT FROM MMA INDICATED BY GR1 AND STORED IN FR8. THAT IS, A(i) IS SET IN THE FR8. THEN THE VALUE OF GR 1 IS ADDED WITH 8. THAT IS, GR1 INDICATES MMA OF B(i+1) |
| 2 | | FMLT FR10,FR8,FR7 | THE PRODUCT OF THE VALUE OF FR8 BY THE VALUE OF 7 IS STORED IN FR10. THAT IS, B(i)*S ENTERS FR10. |
| 3 | | FSTM 8(GR3),FR10 | THE VALUE OF FR10 IS STORED IN MMA INDICATED BY GR3, THAT IS, B(i)*S ENTERS A(i). THEN 8 IS ADDED TO THE VALUE OF GR3. THAT IS, GR3 INDICATES MMA OF A(i+1) |
| 4 | | BCNT GR4,LOOP | 1 IS SUBTRACTED FROM THE VALUE OF GR4. IF THE SUBTRACTED RESULT IS NOT ZERO, THE PROGRAM BRANCHES INTO AN ADDRESS "LOOP". THAT IS, IF i<N, THEN THE PROGRAM RETURNS TO "LOOP". |

GR : GENERAL REGISTER
FR : FLOATING POINT REGISTER
MMA : NAIN MEMORY ADDRESS

FIG. 12

| NO. | RELATIVE ADDRESS | INSTRUCTION STRING | | OPERATION |
|---|---|---|---|---|
| 1 | LOOP | FLDM | 8(GR1),FR12 | B(i)→FR12 |
| 2 | | FLDM | 8(GR1),FR13 | B(i+1)→FR13 |
| 3 | | FLDM | 8(GR1),FR14 | B(i+2)→FR14 |
| 4 | | FLDM | 8(GR1),FR15 | B(i+3)→FR15 |
| 5 | | FMLT | FR20,FR12,FR7 | B(i)*S→FR20 |
| 6 | | FMLT | FR21,FR13,FR7 | B(i+1)*S→FR21 |
| 7 | | FMLT | FR22,FR14,FR7 | B(i+2)*S→FR22 |
| 8 | | FMLT | FR23,FR15,FR7 | B(i+3)*S→FR23 |
| 9 | | FSTM | 8(GR3),FR20 | FR20→A(i) |
| 10 | | FSTM | 8(GR3),FR21 | FR21→A(i+1) |
| 11 | | FSTM | 8(GR3),FR22 | FR22→A(i+2) |
| 12 | | FSTM | 8(GR3),FR23 | FR23→A(i+3) |
| 13 | | BCNT | GR4,LOOP | IF i<N/4 THEN GO TO LOOP |

DATA PROCESSING UNIT

CROSS-REFERENCE TO RELATED APPLICATIONS

The present application is a continuation-in-part of U.S. patent application Ser. No. 08/162,252 filed on Dec. 7, 1993, now U.S. Pat No. 5,581,721, and is a continuation-in-part of Ser. No. 08/977,298 filed Nov. 16, 1992, now U.S. Pat. No. 5,438,669. U.S. Pat Nos. 5,581,721 and 5,438,669 are incorporated herein by reference. 1993, now U.S. Pat. No. 5,581,721, and is a continuation-in-part of Ser. No. 08/977, 298 filed No. 16, 1992, now U.S. Pat. No. 5,438,669. U.S. Pat. Nos. 5,581,721 and 5,438,669 are incorporated herein by reference.

BACKGROUND OF THE INVENTION

1. Field of the Invention

The present invention relates to data processing units which can make access to a greater number of registers than the number of registers which can be addressed by instructions, and more particularly, to a data processing unit which can hardly induce the drop of performance due to data transfer from a main memory during a so-called "vector processing" for continuously processing data of a large scale, for which a cache is not much effective, and which can accomplish an effective pseudo-vector processing by an ordinary data processing unit.

2. Description of the Related Art

JP-A-57-166649 is known as one of the prior art references which describe data processing units which can make access to a greater number of registers than the number of registers accessible by instructions.

According to this prior art technique, a greater number of registers (referred to as "hardware registers") than the number of general purpose registers addressable by a program are provided, so that when a plurality of load instructions are issued to the same general purpose registers from different main memory addresses, the data are stored in the same number of hardware registers as the number of the load instructions.

In the prior art, more in detail, when the number of general purpose registers addressable by the program is 16, for example, sixteen hardware registers for each general purpose register, or in other words, a total of 256 of hardware registers are prepared, and the hardware registers Nos. 0 to 15, for example, are allocated to the general purpose register No. 0. When a load instruction designating 16 different main memory addresses for the general register No. 0 is executed, the data from the 16 load instructions are stored in the hardware registers Nos. 0 to 15.

In the prior art, there is also provided a memory mechanism for previously registering the main memory addresses of the load instructions that have been executed in the past, and the number of the hardware registers storing the data loaded at that time. When the load instruction issued by the program coincides with the main memory address registered to this memory mechanism, the data is read out not from the main memory but from the corresponding hardware register.

Since the prior art has such a system, the number of times look-up to the main memory is required can be reduced and a drop in unit performance due to collision of the look-up registers between the instructions can be prevented.

Another prior art technology employed on a data processing unit which can access a greater number of registers than the number of registers accessible by instructions is described in Hennesy & D. A. Patterson, "Computer Architecture: A Quantitative Approach", Morgan Kaufmann Publishers, Inc. (1990).

In this prior art, a greater number of registers (called "physical registers") than the number of registers addressable by a program are provided, and the physical registers are allocated among a plurality of segments referred to as "windows". In other words, each window comprises a plurality of physical registers. It is assumed for example that the registers are numbered from Nos. 1 to n by the programs and the physical registers are numbered by n*m (the mark * means multiplication), that is, from Nos. 1 to No. n*m.

When m windows, that is, from Nos. 1 to m, are provided, the window No. 1 can be allotted to the physical registers Nos. 1 to n, and the window No. 2, to the physical registers Nos. n+1 to 2n, for example. It is common practice to provide physical registers common to all the windows, physical registers common to adjacent windows, etc.

Each window has the registers used by one program. In other words, to look up the register accessible by a certain program is actually to look up the physical register belonging to a certain window. For instance, assume that if a window 2 is allotted to a certain program in the example given above, then when the register k is designated by this program, the physical register which is to be looked up is physical register n+k.

This window is used in the following way. Assume that the window j is allotted to a certain program. Then, when this program calls another program, the window j+1 is allotted to this called program. Assume that window j is allotted to a certain program. Then, when the program returns to a program calling it, the window j−1 is allotted to the program of the return end.

Generally, in a system having only the same number of registers as the number of registers addressable by the programs, the data so far stored in the registers must be stored in the main memory whenever call of the program such as described above occurs, so as to preserve the data at the time of occurrence of the call, and the data so far stored in the main memory must be rewritten to the registers, whenever the return of the program occurs, so as to re-start the program.

In the prior art, on the other hand, when the windows and physical registers are used in such a manner as described above, the program to which a different window is allotted looks up a different physical register. For this reason, storage from the register into the main memory and re-write from the main memory to the register as described above can be made unnecessary, and processing can be sped up as much.

In the system having such a window mechanism as described above, however, such control must be required that "when call of a program is generated from a program having the greatest window number, interrupt of window overflow be made, whereas when return of a program is generated from the program having the smallest window number, interrupt of window underflow be made".

SUMMARY OF THE INVENTION

The present invention is directed to a technology which enables a data processing unit to access a greater number of registers than the number of registers addressable by instructions, and explanation will be made in connection with the case where the registers are floating point registers for storing floating point numbers to explain the above problems in the prior art.

$$A(i)=B(i)*S \quad i=1, N \qquad (1)$$

where A and B are vectors of an element number N and S is a scalar.

FIG. 11 is a program for use when the equation (1) is executed by a general purpose computer. Explanation will be made below by referring to the program as an example. In the following description, the data width of the floating point registers is assumed to be 8 bytes.

The function of each of the instructions shown in FIG. 11 will first be explained below.

FLDM a(GRm), FRn (Function)

8-byte data is read out from a main memory address indicated by the value of a general register m and is stored in a floating point register n. Thereafter, the value of the general register m is added with a.

FMLT FRj, FRm, FRn (Function)

The product of the value of the floating point register m and the value of the floating point register n is stored in the floating point register j.

FSTM a(GRm), FRj (Function)

The value (8-byte) of the floating point register j is stored in a main memory address indicated by the value of the general register m. Thereafter, the value of the general register m is added with a.

BCNT GRm, t (Function)

The value of GRm is subtracted by 1. If the result is not zero, the program branches to the address t. If it is zero, the program does not branch.

It is assumed in the above explanation that the vector B is stored in a continuous region starting with a main memory address ad1, followed by the execution of the of the program shown in FIG. 11. In other words, the main memory address of a vector B(1) and the main memory address of a vector B(2) are stored at ad1 and ad1+8, respectively. It is also assumed that the vector A is stored similarly in a continuous region starting with the main memory address ad3. Further, addresses ad1, ad3 and the element number N are assumed to be stored in advance in the general register 1, the general register 3 and the general register 4, respectively. The scalar S is further assumed to be stored in advance in the floating point register 7.

As can be seen from FIG. 11, B(i) is loaded to the floating point register 8 by the FLDM instruction No. 1, the product of the value of this floating point register 8 and the value of the floating point register 7 is stored in the floating point register 10 by the FMLT instruction No. 2, and the value of this floating point register 10 is stored as a vector in the address A(i) of the main memory having the general register 3 by the FSTM instruction No. 3.

In other words, in the program of FIG. 11, when a loop comprising the four instructions is executed once, the result of one element can be determined, and all the elements can be vector-calculated by executing this loop N times.

In the calculation based on such program, the execution time of one loop becomes a problem. In the example of the illustrated program, the data is first loaded from the main memory to the floating point register 8 by the FLDM instruction No. 1. When any data exists in the cache, the FLDM instruction can be determined with a small number of cycles; whereas, when no data exists in the cache, the data must be read out from the main memory having a considerably lower speed than the cache, and thus a longer time is necessary than when any data exists in the cache.

Next, the FMLT instruction No. 2 uses the value of the floating point register 8. Therefore, unless the loading operation described above is completed, the execution cannot be started. The FSTM instruction No. 3 uses the value of the floating point register 10, but since the value of the floating point register 10 is not determined before the execution of the preceding FMLT instruction is completed. Accordingly, the execution cannot be started until the execution of the instruction No. 2 is completed.

That is, in the aforementioned program, two factors for reducing the performance, i.e., (1) the data read time and (2) collision of the registers, prolong the execution time of the loop. Particularly the data read time (1) becomes a critical problem in the case of computation handling enormous data, and necessary data cannot be fully stored in the cache and the drop of the performance becomes greater.

FIG. 12 shows an example of the program capable of solving the above problem, which is a technique known as "loop unrolling".

This method is to reduce the number of times of looping to 1/n in comparison with the case where a plurality of elements (=n) are processed by one loop and one element is processed by one loop. FIG. 12 shows the example which can process four elements by one loop.

It is assumed in FIG. 12 that, prior to the execution of the illustrated program, the vector B is stored in advance in a continuous region starting with the main memory address ad1. More specifically, the vector B(1) is stored in the main memory address ad1 and the vector B(2) is stored in the main memory address ad1+8. Similarly, the vector A is assumed to be stored in a continuous region starting with the main memory address ad3. It is also assumed that the main memory addresses ad1, ad3 and ¼ of the vector element number N are stored in advance in the general register 1, the general register 3 and the general register 4, respectively. It is further assumed that the scalar S is stored in advance in the floating point register 7.

In the program shown in FIG. 12, when a loop comprising 13 instructions is once executed, the result of four elements can be determined, and when this loop is executed N/4 times, all the elements can be calculated.

In the program shown in FIG. 12, with respect to the i-th element, the loading operation is carried out by the FLDM instruction No. 1, the multiplying operation is by the FMLT instruction No. 5, and the storing operation is by the FSTM instruction No. 9. Similarly, with respect to the (i+1)-th element, the loading operation is carried out by the FLDM instruction No. 2, the multiplying operation is by the FMLT instruction No. 6, and the storing operation is by the FSTM instruction No. 10. Likewise, with regard to the (i+2)-th element, the loading operation is carried out by the FLDM instruction No. 3, the multiplying operation is by the FMLT instruction No. 7, and the storing operation is by the FSTM instruction No. 11. Similarly, with regard to the (i+3)-th element, the loading operation is carried out by the FLDM instruction No. 4, the multiplying operation is by the FMLT instruction No. 8, and the storing operation is by the FSTM instruction No. 12.

In comparison of the program of FIG. 12 with that of FIG. 11, therefore, a series of processing such as the loading, multiplying and storing operations over the vector element indicated by a certain element number are executed as separated from one another on an instruction string, whereby the influence of the aforementioned two factors for causing the performance drop, that is, (1) the data read time and (2) the registers collision, can be reduced.

For example, in FIG. 12, the loading operation of the vector B(i) is carried out by the FLDM instruction No. 1, but it is only after four instructions that the load result is employed. Accordingly, if the data read time is within four cycles, the FMLT instruction No. 5 using this load result is not brought into the wait state. Further, it is only after four instructions that the multiplication result B(i)*S by the FMLT instruction No. 5 is used. Accordingly, if the time necessary for the multiplication is within the four cycles, the FSTM instruction No. 9 is not brought into the wait mode.

Though the use of the aforementioned loop unrolling technique enables the improvement of the system processing performance, the technique has a drawback that a large number of registers are necessary. Meanwhile, the program shown in FIG. 11 needs three floating point registers; while the program shown in FIG. 12 needs nine floating point registers. In the loop unrolling technique, if the data read time is much more longer or if the calculation time is longer, a greater number of vector elements must be processed in one loop, so that a greater number of registers become necessary.

Generally, a register comprises an active device (that is, a device which is not a memory device) and can be provided with a large number of read/write ports (that is, data input/output ports). Therefore, the register can be operated at such a speed that is far higher than that of a so-called "memory device" which can read/write only one data in one operational cycle. Therefore, for the purpose of making higher the operational speed of the data processing unit, the system must essentially include registers having a sufficient capacity which is much larger not only than that of the main memory but also than that of the cache. Nevertheless, the conventional system has had a relatively small number of registers. This is why the cost per register bit is high and the length of a field of a register number on the instruction format is limited, which will be explained below. Although the problem of cost has now been solved to some extent by making the registers in the form of an LSI, the latter problem is left yet to be solved.

The number of registers which can be addressed by a program is generally limited by the architecture. For example, if five bits of register designation field exist in an instruction word, the number of registers which can be addressed is 32 ($2^5$). The number of registers addressable by the program can be increased by increasing the number of bits of the register designation field, but this is impractical because this involves change of the instruction format and hence change of the existing program.

Therefore, such a system has become demanded that enables a data processing unit to make access to a greater number of registers than the number of registers addressable by an instruction, without changing the architecture of the data processing unit. Such a method corresponds to the earlier-mentioned prior art technique. The former prior art can realize a high processing speed when a load instruction is newly executed to the main memory address to which the load instruction has been executed in the past. However, this prior art has a problem that, in most of the vector calculations expressed by the equation (1), the prior art cannot realize a high processing speed when a load request for the data on the main memory is issued only once.

The latter prior art, on the other hand, has a problem that it is only the physical registers belonging to a certain window that can be used by one program, and the number of such registers is equal to the number of registers that can be addressed by the program, which results in that the operation executed by one program cannot be sped up.

In other words, in the prior art, the aforementioned window function can speed up the processing speed only when call and return of the program occur, but cannot speed up the processing speed when the processing is completed by one program, as in the vector calculation of the equation (1).

Another problem in the latter prior art is that the interrupt of window overflow and window underflow is not necessary when the processing is completed by one program and call and return of the program do not occur, as in the vector calculation of the equation (1).

It is an object of the present invention to provide a data processing unit which can solve the above problems in the prior arts, can make access to a greater number of registers than the number of registers addressable by an instruction while eliminating the need for changing the architecture of the data processing unit, and which can execute at a high speed the vector calculation in scientific and technological calculation.

It is another object of the present invention to provide a data processing unit which can realize the above function while avoiding the need for increasing the number of bits in an instruction word newly provided to realize the function.

In accordance with an aspect of the present invention, the above objects are attained by providing a data processing unit which comprises floating point registers which are greater than the number of floating point registers addressable by a floating point register field of an instruction and which are referred to as physical floating point registers to be looked up by a physical floating point register number; window start pointer registers for storing a number referred to as a window start pointer; registers which are referred to as window start point valid registers indicating that the window start pointer is valid; and a conversion circuit, when the window start pointer valid register is 1, for converting a value, which is referred to as logical floating point register number and which is indicated in the floating point register field in the instruction, into a physical floating point register value by the value of the window start pointer; and wherein there are further provided a floating point register pre-load instruction having therein a floating point register field longer than the floating point register field of an ordinary instruction for storing main memory data in the physical floating point register obtained by converting the logical floating point register number by a value obtained from the window start pointer; a floating point register post-store instruction having therein the floating point register field longer than the floating point register field of the ordinary instruction for storing data into a main memory from the physical floating point register obtained by converting the logical floating point register number by a value obtained from the window start pointer; and a window start pointer set instruction for setting a value in the window start pointer register.

In the present invention, with the above arrangement, since it becomes unnecessary to change the format (length of the instruction) of the ordinary instruction, the need for changing the architecture of the data processing unit and the need for re-writing a conventional program can be eliminated.

In all the instructions which look up the floating point registers, other than the floating point register pre-load instruction and the floating point register post-store instruction newly provided in the present invention; when the value of the window start pointer valid register is 1, conversion is made from the logical floating point register number to the physical floating point register number, and the physical floating point register number is looked up by reference of the floating point register. If the value of the window start pointer valid register is 0, the logical floating point register number is regarded as equal to the physical floating point register number.

When the value of the window start pointer valid register is 1 in the floating point register pre-load instruction and the floating point register post-store instruction, conversion between the logical floating point register number and the physical floating point register number is carried out as described above, and the physical floating point register is looked up depending on the conversion result. When the value of the window start pointer valid register is 0, the logical floating point register number is equal to the physical floating point register which is looked up.

The conversion between the logical floating point register number and the physical floating point register number is carried out in the following manner.

It is assumed in the following explanation that the number of logical floating point registers for the ordinary instruction is 32, that is, the floating point register designation field has 5 bits in the ordinary instruction, and the logical floating point registers can be designated from 0 to 31 by the instruction. It is further assumed that the number of physical floating point registers is 128, and the physical floating point register number can be selected from 0 to 127. When the number of physical floating point registers is expressed by mr and when the number mr is any power of 2, the value of its exponential will be expressed by sm (that is, mr=2sm). Here, the symbol  represents the power. When mr is not the power of 2, an integer larger than $\log_2$ (logarithm having 2 as the base) mr and most approximate thereto is used as sm. Hereinafter, sm is called a pointer width maximum value.

More specifically, in the above example, mr=128 and sm=7. Among the physical floating point registers, those registers which are always converted to the same register number during the conversion of the logical floating point register number to the physical floating point register number and are used in common by all the windows will be referred to as global registers, and the number of such global registers will be expressed by mg. Further, the bit number of the window start pointer register width is expressed by q (where q is a positive integer smaller than or equal to sm). 2**(sm−q) will be called a window cut width and will be hereinafter be expressed by a symbol sp. Further, the value of the window start pointer is expressed by FWSTP.

In an example to be explained below, sm=7 and q=5. Accordingly, it is assumed that sp=4, the floating point register designation field of the ordinary instruction has 5 bits, and the floating point register designation field of the floating point register preload and post-store instructions has 7 bits. When the logical floating point register number is expressed by r, the physical floating point register number is determined by FWSTP and r and thus is expressed by <FWSTP, r>.

In the above example, conversion from the logical floating point register number to the physical floating point register number is carried out in the following manner.

1. When 0≤r≤mg−1, $$<FWSTP,r>=r \qquad (2)$$

irrespective of FWSTP.

2. When mg≤r≤2^q−1, $$<FWSTP,r>=mg+\{sp*FWSTP+[r-mg],[mod(mr-mg)]\} \qquad (3)$$

FIG. 3 is a diagram for explaining the conversion from the logical floating point register number to the physical floating point register number expressed by the above equations (2) and (3) in connection with an example where FWSTP=15, mr=128 and mg=8.

The conversion expressed by the equations (2) and (3) has the following 5 features.

1. The physical floating point registers numbered by Nos. "0" to "mg−1" are used in common for each FWSTP. These registers hold data which is common to arithmetic loops using the respective FWSTPs, as the global registers.

2. Among the registers other than the global registers, the logical floating point register which can be specified by one FWSTP and the logical floating point register which can be specified by another FWSTP sometimes represent the same physical floating point register. These registers are used for data transfer between the arithmetic loops using the different FWSTPs, as overlap registers.

3. When the pointer width maximum value sm or the window start pointer register width q is changed, the window cut width can be changed.

When sm=7 for example, the register cut is 2 at q=6, while, the register cut is 8 at q=4.

The following explanation will be made on the assumption that sm and q are fixed at 7 and 5 respectively.

4. Since the ordinary instruction has 5 bits of r and the floating point register pre-load and post-store instructions have 7 bits of r, the ordinary instruction can make access to the physical floating point registers numbered by Nos. "0" to "mg−1" as the global registers and numbered by Nos. "FWSTP*sp+mg" to "FWSTP*sp+31" (when exceeding 127, which is lapped around mg) and the floating point register pre-load and post-store instructions can make access to all the physical floating point registers, as shown in FIG. 3.

5. When mg is set to be variable, the present invention can flexibly cope with applications having different numbers of data (which are called 'loop invariants') common to the arithmetic loops.

FIGS. 4 and 5 show a diagram for explaining the conversion from the logical floating point register number to the physical floating point register number for all the FWSTPs with use of the ordinary instruction at sp=4; while FIGS. 6 and 7 show a diagram for explaining the conversion from the logical floating point register number to the physical floating point register number for all the FWSTPs with use of the floating point register pre-load and post-store instructions at sp=4.

The following explanation will be made on the assumption that mg is fixed at 8 and the mnemonics of instructions newly provided in accordance with the present invention and functions thereof are determined as follows by way of example.

1. Window start pointer set instruction:

(Instruction mnemonic) FWSTPS u,v (Function)

When u=0, v is set to the window start pointer register. When u=1, v is added to the value of the window start pointer register. In this case, addition is made using (mr−mg)/sp as a modulus. That is, when v is set at 1 for u=0, FWSTP becomes 1.

2. Floating point register pre-load instruction:

(Instruction mnemonic) FLDPRM a(GRm), FRn (Function)

8-byte data is read out from the main memory address indicated by the value of the general register m and is stored in the floating point register n. At this time, conversion of the logical floating point register number to the physical floating point register number is carried out in accordance with the above equations (2) and (3). Thereafter, the value of the general register m is added with a.

3. Floating point register post-store instruction:
(Instruction mnemonic) FSTPOM a(GRm), FRn
(Function)

The value (8 bytes) of the floating point register n is stored in the main memory address indicated by the value of the general register m. At this time, conversion of the logical floating point register number to the physical floating point register number is carried out in accordance with the equations (2) and (3). Thereafter, the value of the general register m is added with a.

In the ordinary instructions, that is, the instructions using the floating point register other than the above instructions 2 and 3, conversion of the logical floating point register number to the physical floating point register number is carried out in accordance with the equations (2) and (3).

The present invention is particularly effective for a coding method referred to as "modulo scheduling". This modulo scheduling is described in the following references:

B. R. Rau et al, "Register Allocation for Software Pipelined Loops": ACM SIGPLAN, 1992, pages 283–299, and P. Tirumalai et al, "Parallelization Of Loops With Exists On Pipelined Architectures": Supercomputing, 1990, pages 200–212.

The computer to which the present invention is to be applied and explained in the following will be assumed to be a superscalar processor capable of executing a plurality of instructions in parallel. In particular, explanation will be made as to such a superscalar processor as capable of executing a load instruction, an arithmetic instruction and a store instruction in parallel.

In the following explanation, the computer comprises a unit for executing the load instruction, a unit for executing the arithmetic instruction and a unit for executing the store instruction, as separated from one another, and they can be simultaneously activated.

FIG. 8 shows an example of the result obtained by coding the equation (1) by the modulo scheduling. In FIG. 8, LOAD B(i) is an instruction for loading B(i) from the main memory to the floating point register, and the floating point register number is omitted. MULT B(i)*S represents an instruction for multiplying B(i) loaded by LOAD B(i) from the main memory to the floating point register by S stored in another floating point register and for storing the product into still another floating point register, and the floating point register number is omitted.

STORE A(i) represents an instruction for storing the calculation result stored by B(i)*S into the floating point register at the position A(i) of the main memory, and the floating point register number is also omitted. In FIG. 8, the word "cycle" represents the time in a machine cycle unit, and the instructions written in the same cycle are simultaneously started and executed.

In other words, only LOAD B(1) is executed in the cycle 1, LOAD B(5) and MULT B(1)*S are simultaneously started and executed in the cycle 5, and LOAD B(9), MULT B(5)*S and STORE A(1) are simultaneously started and executed.

In the instruction string of the actual program, a plurality of instructions to be simultaneously started and executed are sequentially written. For example, LOAD B(5) and MULT B(1)*S to be simultaneously started and executed in the cycle 5 are written in this order on the actual program. Hardware judges that the start of the simultaneous execution of these two continuous instructions LOAD B(5) and MULT B(1)*S is possible, and activates the respective execution units.

The meanings of instructions shown in FIG. 8 will be explained in the following.

It is assumed that to execute the aforementioned equation (1), processing of each element is executed by one iteration, and that one iteration comprises stage 1: load of B, stage 2: multiplication, and stage 3: store to A. It is also assumed that each stage needs four cycles. That is, each of read of the memory, multiplication and write to the memory needs four cycles.

In this case, four cycles are necessary from the start of the stage 1 to the start of the stage 2 for the i-th element, and four cycles are necessary from the start of the stage 2 to the start of the stage 3. Therefore, multiplication is started after four cycles from load of the i-th element, and further four cycles later, store is started. Load of (i+1)-th element is started after one cycle from load of the i-th element, multiplication of the (i+1)-th element is started after one cycle from multiplication of the i-th element, and store of the (i+1)-th element is started after one cycle from store of the i-th element.

When the instructions are scheduled in this way, there occurs a program portion at which the stage 1 relating to the (i+8)-th element, the stage 2 relating to the (i+4)-th element and the stage 3 relating to the i-th element can be executed simultaneously, as shown in FIG. 8. This portion will be referred to as a "kernel".

The term "to execute simultaneously" as used herein means that the stage 1 relating to the (i+8)-th element, the stage 2 relating to the (i+4)-th element and the stage 3 relating to the i-th element simultaneously proceed at the same timing. This can be realized by using such a superscalar processor as capable of executing in parallel the load instruction, the arithmetic instruction and the store instruction. That is, since the three stages are simultaneously processed at the kernel portion, high speed operation can be attained. In such a program as shown in FIG. 8, the portions ahead and behind the kernel portion will be referred to as "prologue" and "epilogue", respectively. As already explained above, in the instruction string of the actual program, a plurality of instructions to be simultaneously started and executed are written in sequence.

In this connection, the computer to be employed in the present invention may be such a superscalar processor as capable of executing in parallel the load or store instruction and the arithmetic instruction, that is, incapable of simultaneously executing the load instruction and the store instruction. In other words, a superscalar processor lower in performance than the aforementioned superscalar processor may be employed. In the latter case, each cycle for the kernel portion of FIG. 8 comprises 2 cycles (one for executing the LOAD instruction and the other for executing MULT and STORE instructions), and the operation thereof is substantially the same as the above.

FIGS. 9 and 10 show an example of the program of FIG. 8 obtained by coding the above equation (1) by the modulo scheduling and by modifying it to be applied to the present invention.

It is assumed herein that the computer for executing the program shown in FIGS. 9 and 10 is a superscalar processor capable of executing in parallel the load instruction, the arithmetic instruction and the store instruction, as in the above case. It is also assumed that a vector B is stored in a continuous region starting with a main memory address ad1 prior to the execution of the program shown in FIGS. 9 and 10. That is, the main memory address of B(1) is ad1 and the main memory address of B(2) is ad1+8. Similarly, it is assumed that a vector A is stored in a continuous region starting with the main memory address ad3. It is further assumed that ad1 is stored in the general register 1, ad3 is in the general register 3, (N−8) is in the general register 4, 1 is in the window start pointer valid register, and S is in the physical floating point register 7.

Explanation will be made as to the program of FIGS. 9 and 10.

In the FWSTPS instruction of No. 1, 0 is set to the window start pointer. In the FLDPRM instruction of No. 2, B(1) is stored in the physical floating point register <0,8> because FWSTP=0. In the FLDPRM instruction of No. 3, B(2) is stored in the physical floating point register <1,12> (=physical floating point register <1,8>) because FWSTP=0. In the FLDPRM instruction of No. 4, B(3) is stored in the physical floating point register <0,16> (=physical floating point register <2,8>because FWSTP=0. In the FLDPRM instruction of No. 5, B(4) is stored in the physical floating point register <0,20> (=physical floating point register <3,8> because FWSTP=0. In the FLDPRM instruction of No. 6, B(5) is stored in the physical floating point register <0,24> (=physical floating point register <4,8> because FWSTP=0.

In the FMLT instruction of No. 7, the logical floating point register 7 is designated, and this register is the physical floating point register 7 from the equation (2), that is, the global register. Accordingly, the value (=S) of the physical floating point register 7 is read out, and since FWSTP=0, the product is calculated with the physical floating point register <0,8> (=B(1)) and is stored in the physical floating point register <0,10>. In the FWSTPS instruction of No. 8, 1 is added to the window start pointer. That is, FWSTP=1. In the FLDPRM instruction of No. 9, B(6) is stored in the physical floating point register <1,24> (=physical floating point register <5,8>) because FWSTP=1.

In the FMLT instruction of No. 10, the product is calculated between the physical floating point register <1,8> (=B(2)) and S and the result is stored in the physical floating point register <1,10> because FWSTP=1. In the FWSTPS instruction of No. 11, 1 is added to the window start pointer. In other words, FWSTP=2. In the FLDPRM instruction of No. 12, B(7) is stored in the physical floating point register <2,24> (=physical floating point register <6,8>) because FWSTP=2.

In the FMLT instruction of No. 13, the product is calculated between the physical floating point register <2,8> (=B(3)) and S and the result is stored in the physical floating point register <2,10> because FWSTP=2. In the FWSTPS instruction of No. 14, 1 is added to the window start pointer. In other words, FWSTP=3. In the FLDPRM instruction of No. 15, B(8) is stored in the physical floating point register <3,24> (=physical floating point register <7,8>) because FWSTP=3.

In the FMLT instruction of No. 16, the product is calculated between the physical floating point register <3,8> (=B(4)) and S and the result is stored in the physical floating point register <3,10> because FWSTP=3. In the FWSTPS instruction of No. 17, 1 is added to the window start pointer. That is, FWSTP=4.

A string of the aforementioned instructions of Nos. 1 to 17 form the prologue in FIG. 8. The instructions from the FLRPRM instruction of No. 18 to the BCNT instruction of No. 22 constitute a loop to be repeatedly executed (N−8) times.

Explanation will be made as to the loop executed at the i-th time (i starting with 1). FWSTP represents (i+3) (mod 30).

In the FLDPRM instruction of No. 18, since FWSTP=(i+3) (mode 30), B(i+8) is loaded to the physical floating point register <i+3, (mode 30),24> (=physical floating point register <i+7 (mode 30), 8>. The loaded data is used in the FMLT instruction of No. 19 4 cycles later.

In the FMLT instruction of No. 19, since FWSTP=i+3 (mode 30), a product between the physical floating point register <i+3 (mode 30),8> (=B(i+4)) and S is carried out and the result is stored in the physical floating point register <i+3 (mod 30),10>. In this case, the data being stored in the physical floating point register <i+3 (mode 30),8> was loaded by the FLDPRM instruction of No. 18 4 cycles before. And the data stored in the physical floating point register <i+3 (mod 30),10> will be used by the FSTPOM instruction of No. 20 4 cycles later.

Since FWSTP=i+3 (mod 30) in the FSTPOM instruction of No. 20, the value of the physical floating point register <i+3 (mod 30),114> (=physical floating point register <i−1 (mod 30),10> is stored at the main memory address. The data being stored in the physical floating point register <i+3 (mod 30),114> (=physical floating point register <i−1 (mod 30),10> was stored by the FMLT instruction 4 cycles before.

In the FWSTPS instruction of No. 21, 1 is added to the window start pointer. That is, FWSTP=i+4 (mod 30). The program returns to the head part of the loop by the BCNT instruction of No. 22.

As has been explained above, such processing is carried out in the i-th loop that the data B(i+8) multiplied in the loop of 4 loops later is stored in the physical floating point register <i+3 (mod 30),24> (=physical floating point register <i+7 (mod 30),8>, the data B(i+4) stored in the physical floating point register <i+3 (mod 30),30> in the loop of 4 loops before is used for the multiplication, the multiplication result is stored in the physical floating point register <i+3 (mod 30),10>, and the data B(i)*S corresponding to the multiplication result obtained in the loop of 4 loops before and being stored in the physical floating point register <i+3 (mod 30),114> (=physical floating point register <i−1 (mod 30),10>) is stored at the main memory address A(i).

The instructions of from the FLDPRM instruction of No. 18 to the BCNT instruction of No. 22 correspond to such a kernel portion as shown in FIG. 8.

The instructions of Nos. 23 to 41 after the program goes out of the loop are to process unprocessed elements, which will next be explained below.

In the FMLT instruction of No. 23, since FWSTP=N−4 (mode 30), the product of the physical floating point register <N−4 (mod 30),8> (=B(N−3)) and S is carried out and the result is stored in the physical floating point register <N−4 (mod 30),10>. In the FSTPOM instruction of No. 24, since FWSTP=N−4, the value of the physical floating point register <N−4 (mode 30),114> (=physical floating point register <N−8 (mod 30),10>) is stored in the main memory address of A(N−7). In the FWSTPS instruction of No. 25, 1 is added to the window start pointer. That is, FWSTP=n−3 (mod 30).

In the FMLT instruction of No. 26, since FWSTP=N−3, the product of the physical floating point register <N−3 (mod 30),8> (=B(N−2)) and S is carried out and the result is stored in the physical floating point register <N−3 (mod 30),10>. In the FSTPOM instruction of No. 27, since FWSTP=N−3, the value of the physical floating point register <N−3 (mode 30),114> (=physical floating point register <N−7 (mod 30), 10>) is stored in the main memory address of A(N−6). In the FWSTPS instruction of No. 28, 1 is added to the window start pointer. That is, FWSTP=N−2 (mod 30).

In the FMLT instruction of No. 29, since FWSTP=N−2 (mode 30), the product of the physical floating point register <N−2 (mod 30),8>(=B(N−1)) and S is carried out and the result is stored in the physical floating point register <N−2 (mod 30),10>. In the FSTPOM instruction of No. 30, since FWSTP=N−2, the value of the physical floating point register <N−2 (mode 30),114> (=physical floating point register <N−6 (mod 30),10>) is stored in the main memory address of A(N−5). In the FWSTPS instruction of No. 31, 1 is added to the window start pointer. That is, FWSTP=N−1 (mod 30).

In the FMLT instruction of No. 32, since FWSTP=N−1 (mode 30), the product of the physical floating point register <N−1 (mod 30),8> (=B(N)) and S is carried out and the result is stored in the physical floating point register <N−1 (mod 30),10>. In the FSTPOM instruction of No. 33, since FWSTP=N−1 (mod 30), the value of the physical floating point register <N−1 (mode 30),114> (=physical floating point register <N−5 (mod 30),10>) is stored in the main memory address of A(N−4). In the FWSTPS instruction of No. 34, 1 is added to the window start pointer. That is, FWSTP=N (mod 30).

In the FSTPOM instruction of No. 35, since FWSTP=N (mod 30), the value of the physical floating point register <N (mode 30),114> (=physical floating point register <N−4 (mod 30),10>) is stored in the main memory address of A(N−3). In the FWSTPS instruction of No. 36, 1 is added to the window start pointer. That is, FWSTP=N+1 (mod 30).

In the FSTPOM instruction of No. 37, since FWSTP=N+1 (mod 30), the value of the physical floating point register <N+1 (mode 30),114> (=physical floating point register <N−3 (mod 30),10>) is stored in the main memory address of A(N−2). In the FWSTPS instruction of No. 38, 1 is added to the window start pointer. That is, FWSTP=N+2 (mod 30).

In the FSTPOM instruction of No. 39, since FWSTP=N+2 (mode 30), the value of the physical floating point register <N+2 (mod 30),114> (=physical floating point register <N−2 (mod 30),10> is stored at the main memory address of A(N−1). In the FWSTPS instruction of No. 40, 1 is added to the window start pointer. That is, FWSTP=N+3 (mod 30).

In the FSTPOM instruction of No. 41, since FWSTP=N+3 (mode 30), the value of the physical floating point register <N+3 (mod 30),114> (=physical floating point register <N−1 (mod 30),10> is stored at the main memory address of A(N).

The string of the instructions of Nos. 23 to 41 mentioned above corresponds to the epilogue of the program of FIG. 8.

As will be appreciated from the processing of the i-th loop, in the aforementioned program, data is written in the logical floating point register number 24 by the FLDPRM instruction of No. 18, and the logical floating point register 8 is used in the FMLT instruction of No. 19 immediately thereafter. The physical floating point register being accessed by the FLDPRM instruction of No. 18 is <i+3 (mod 30),24>, i.e., <i+7 (mod 30),8> that is different from the physical floating point register <i+3 (mod 30),8>. Accordingly, the data read wait does not involve such a phenomenon that the execution of the subsequent instructions must be awaited. In other words, data read is only required to finish before the execution of the FMLT instruction of 4 loops later. As a result, the program can be executed at a high speed.

In the foregoing, the FLDPRM instruction of No. 18, the FMLT instruction of No. 19 and the FSTPOM instruction of No. 20 are simultaneously started and executed. That is, the execution of the FMLT instruction of 4 loops later is carried out after cycles corresponding to (the execution start cycle (=one cycle) of the FSTPOM instruction of No. 18, the FMLT instruction of No. 19 and the FSTPOM instruction of No. 20 plus the execution cycle of the FWSTPS instruction of No. 21 plus the execution cycle of the BCNT instruction of No. 22)*4, so that the data reading operation requiring 4 cycles is already completed 4 loops later, thereby preventing the drop of the performance caused by the data read wait.

Data is written in the logical floating point register number 10 by the FLDPRM instruction of No. 19, and the logical floating point register 114 is used in the FSTPOM instruction of No. 20 immediately thereafter. The physical floating point register being accessed by the FMLT instruction of No. 19 is <i+3 (mod 30),10> that is different from the physical floating point register <i+3 (mod 30),114>, i.e., <i−1 (mod 30),10> being accessed by the FSTPOM instruction of No. 20. Accordingly, the calculation result wait does not involve such a phenomenon that the execution of the subsequent instructions must be awaited. In other words, the multiplication is only required to finish before the execution of the instruction of 4 loops later. As a result, the program can be executed at a high speed.

As mentioned above, the FLDPRM instruction of No. 18, the FMLT instruction of No. 19 and the FSTPOM instruction of No. 20 are simultaneously started and executed. That is, the execution of the FSTPOM instruction of 4 loops later is carried out after cycles corresponding to (the execution start cycle (=one cycle) of the FLDPRM instruction of No. 18, the FMLT instruction of No. 19 and the FSTPOM instruction of No. 20 plus the execution cycle of the FWSTPS instruction of No. 21 plus the execution cycle of the BCNT instruction of No. 22)*4, so that the multiplication requiring 4 cycles is already completed 4 loops later, thereby preventing the drop of the performance caused by the calculation execution wait.

Here is the reason why the processing of the i-th loop has been carried out in such a manner as mentioned above.

In the i-th loop, data is loaded by the FLDPRM instruction of No. 18 to the physical floating point register <i+3 (mod 30),24>, and the physical floating point register <i+7 (mod 30),8> that is equal to <(i+3)+4 (mod 30),8>. For FWSTP corresponding to the addition of 4 to the FWSTP of the associated loop, the logical floating point register has a number of 8. Since the value corresponding to the addition of 4 to the FWSTP becomes a new FWSTP 4 loops later, the associated physical floating point register is accessed by the FMLT instruction of No. 19 of 4 loops later. This is because the physical floating point register <i+7 (mod 30),8> is accessed by the FMLT instruction of No. 19 of 4 loops later.

In the i-th loop, data is stored by the FSTPOM instruction of No. 20 from the physical floating point register <i+3 (mod 30),114>, and the physical floating point register <i−1 (mod 30),10> that is equal to <(i+3)−4 (mod 30),10>. That is, For FWSTP corresponding to a subtraction of 4 from the FWSTP of the associated loop, the logical floating point register has a number of 8. Since the value corresponding to the subtraction of 4 from the FWSTP of the associated loop becomes a new FWSTP, the physical floating point register has the calculation result stored therein by the FMLT instruction of No. 19 of 4 loops before. This is because the physical floating point register <i−1 (mod 30),10> has the calculation result stored therein by the FMLT instruction of No. 19 of 4 loops before.

That is, the FLDPRM instruction of No. 18 in a certain loop loads data to the physical floating point register 8 under the FWSTP corresponding to the addition of 4 to the FWSTP of the associated loop (that is, of 4 loops later). The FMLT instruction of No. 19 of four loops later, that is, of the loop corresponding to the addition of 4 to the FWSTP performs its calculating operation with use of the value of the logical floating point register 8, and the result is placed in the logical floating point register 10. The FSTPOM instruction of No. 20 of further four loops later, that is, of the loop corresponding to the addition of 4 to the FWSTP stores the data in the logical floating point register 10 of the loop subtracted 4 from FWSTPL (that is, of 4 loops before).

That is, in the program shown in FIGS. 9 and 10, the same logical floating point register is designated to different FWSTPs for data transfer between loops and this is realized by the ordinary instruction with use of a long register field.

In the program of FIGS. 9 and 10 used in the present invention, the updating operation of the window start pointer is the overhead operation and the program loop is made up of 5 instructions. In the program of FIGS. 9 and 10, however, 3 of the 5 instructions forming a loop can be simultaneously executed and it can be prevented that the data read wait causing an overhead larger than the overhead of the updating operation of the window start pointer involves waiting of the execution of the subsequent instructions.

In this connection, the computer to be employed in the present invention may such a superscalar processor as capable of simultaneously executing the load or store instruction and the arithmetic instruction in parallel, i.e., incapable of executing the load and store instructions at the same time. That is, there may be employed such a superscalar processor that is lower in performance than the aforementioned superscalar processor. In the latter case, in the program of FIGS. 9 and 10, which is the same as that of the former case, the three instructions of Nos. 18, 19 and 20 in a loop cannot be simultaneously executed and the instruction of No. 20 is only started one cycle after the start of execution of the 2 instructions of Nos. 18 and 19. That is, the program is essentially the same as that of the present invention, except that the loop execution time is prolonged merely by one cycle.

In the program of FIGS. 9 and 10, in accordance with the present invention, the register field of the floating point register pre-load and post-store instructions longer than the ordinary instruction therein enables the physical register number for loading/storing data to be freely determined, and thus the present invention can flexibly cope with a change in the data read time and calculation time.

In accordance with the present invention, the window cut width can be freely modified by changing the window pointer register width (the pointer width maximum value being usually fixed). Further, by making variable the number mg of global registers, the present invention can flexibly cope with even such an application as to have different numbers of loop invariants.

BRIEF DESCRIPTION OF THE DRAWINGS

FIG. 2A shows an embodiment of a window start pointer set instruction used in the present invention;

FIG. 2B shows an embodiment of a floating point register pre-load instruction used in the present invention;

FIG. 2C shows an embodiment of a floating point register post-stop instruction used in the present invention;

FIG. 3 shows diagrams for explaining an example of conversion of a logical floating point register number to a physical floating point register number used in the present invention;

FIGS. 4 and 5 show a diagram for explaining an example of the conversion between the logical floating point register number and the physical floating point register number by an ordinary instruction used in the present invention;

Figure 6:
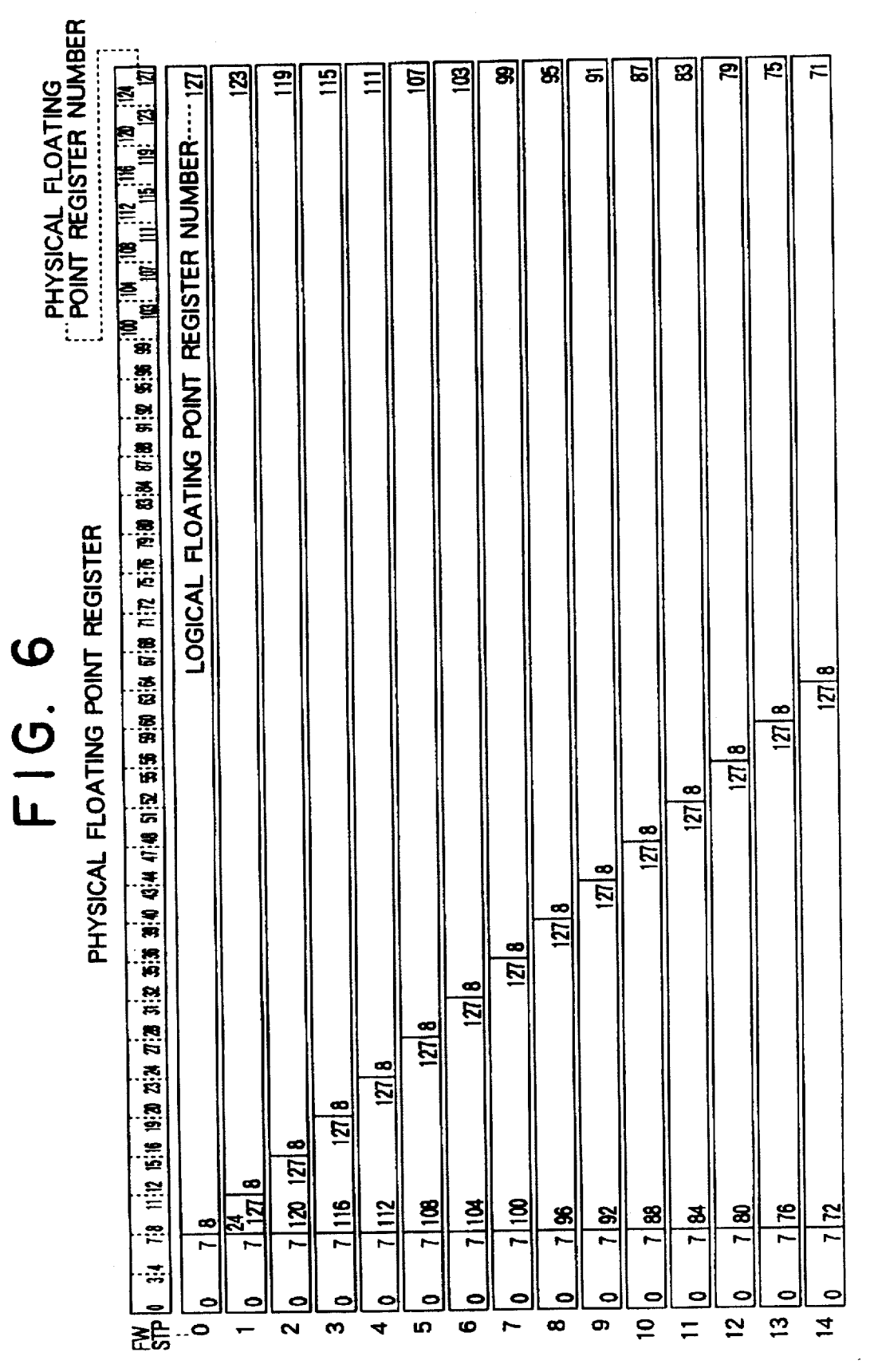
Figure 7:
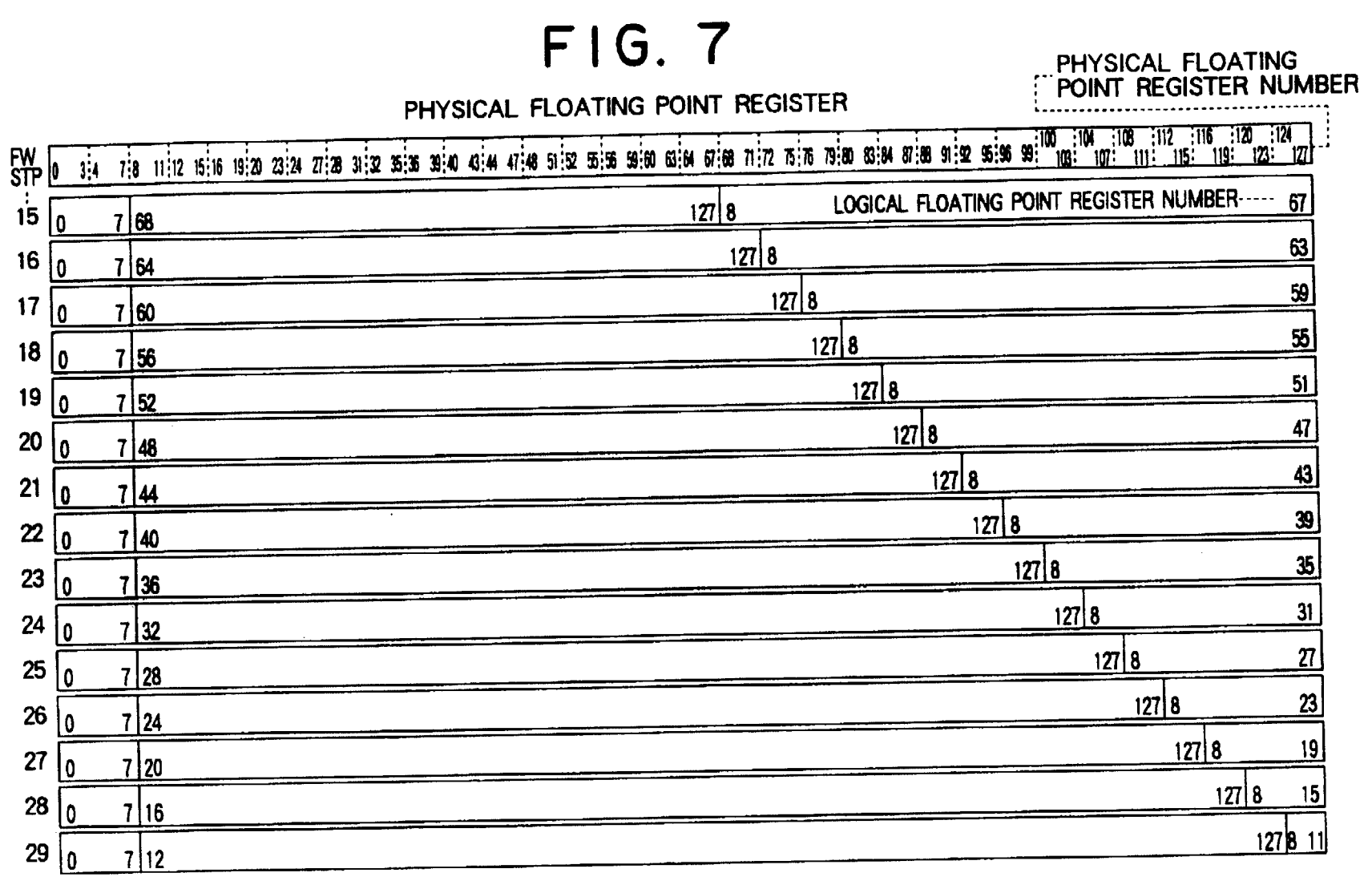

FIGS. 6 and 7 shows a diagram for explaining an example of the conversion between the logical floating point register number and the physical floating point register number by the floating point register pre-load instruction and floating point register post-store instruction used in the present invention;

FIG. 8 is a diagram for explaining an example of a program coded by modulo scheduling method effective in particular in the present invention;

FIGS. 9 and 10 show a diagram for explaining an example of a program corresponding to a program for multiplication between vector and scalar as an example of vector calculation and rewritten by instructions of the present invention;

FIG. 11 shows an example of a program for a general purpose computer for the multiplication between vector and scalar as an example of the vector calculation; and FIG. 12 shows an example of a program obtained by rewriting the program of FIG. 11 by a loop unrolling technique.

DESCRIPTION OF THE PREFERRED EMBODIMENTS

A data processing unit in accordance with an embodiment of the present invention will be detailed by the accompanying drawings.

Figure 1:
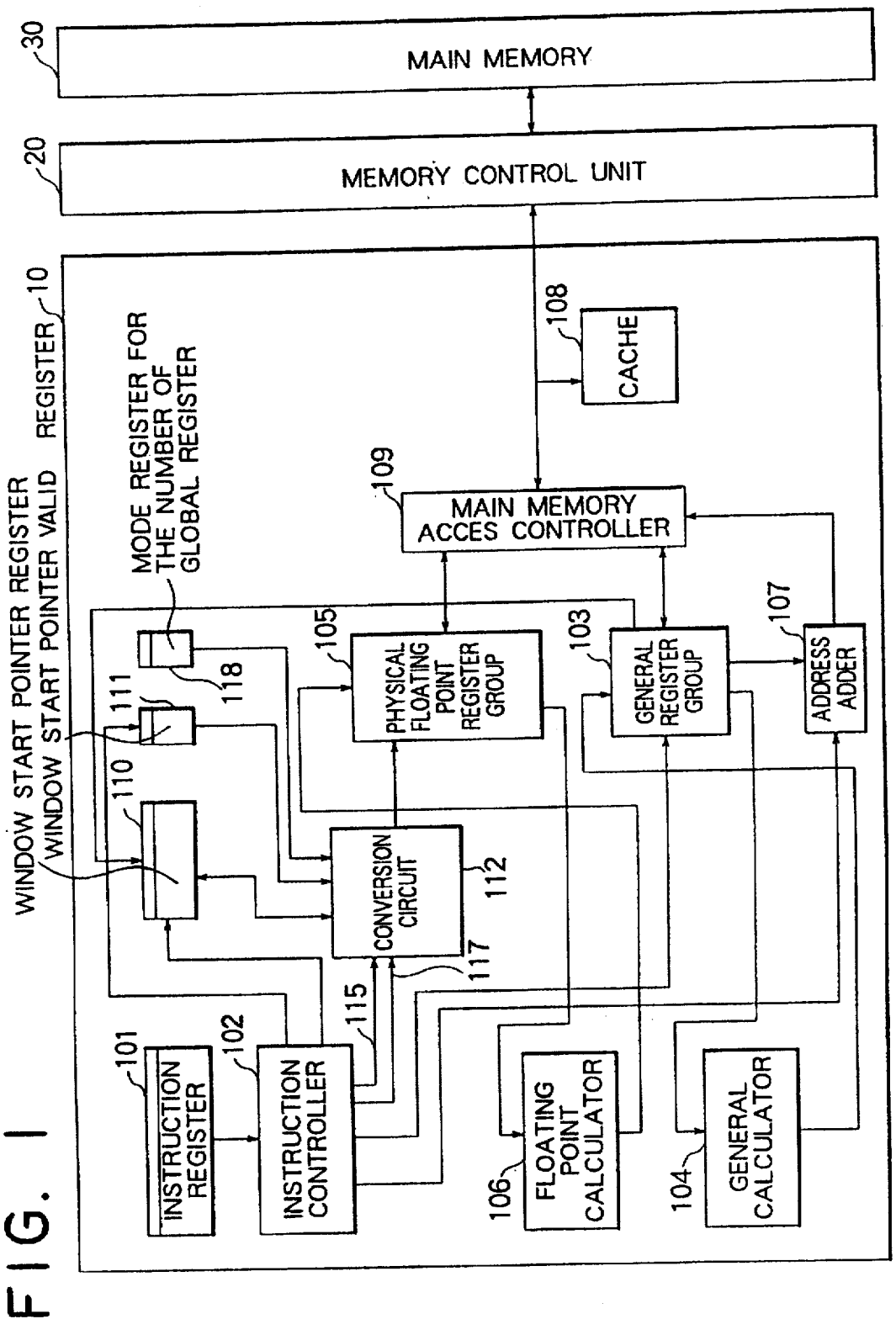
FIG. 1 shows a data processing unit for executing instructions shown in FIGS. 2A to 2C in accordance with an embodiment of the present invention.
Figure 5:
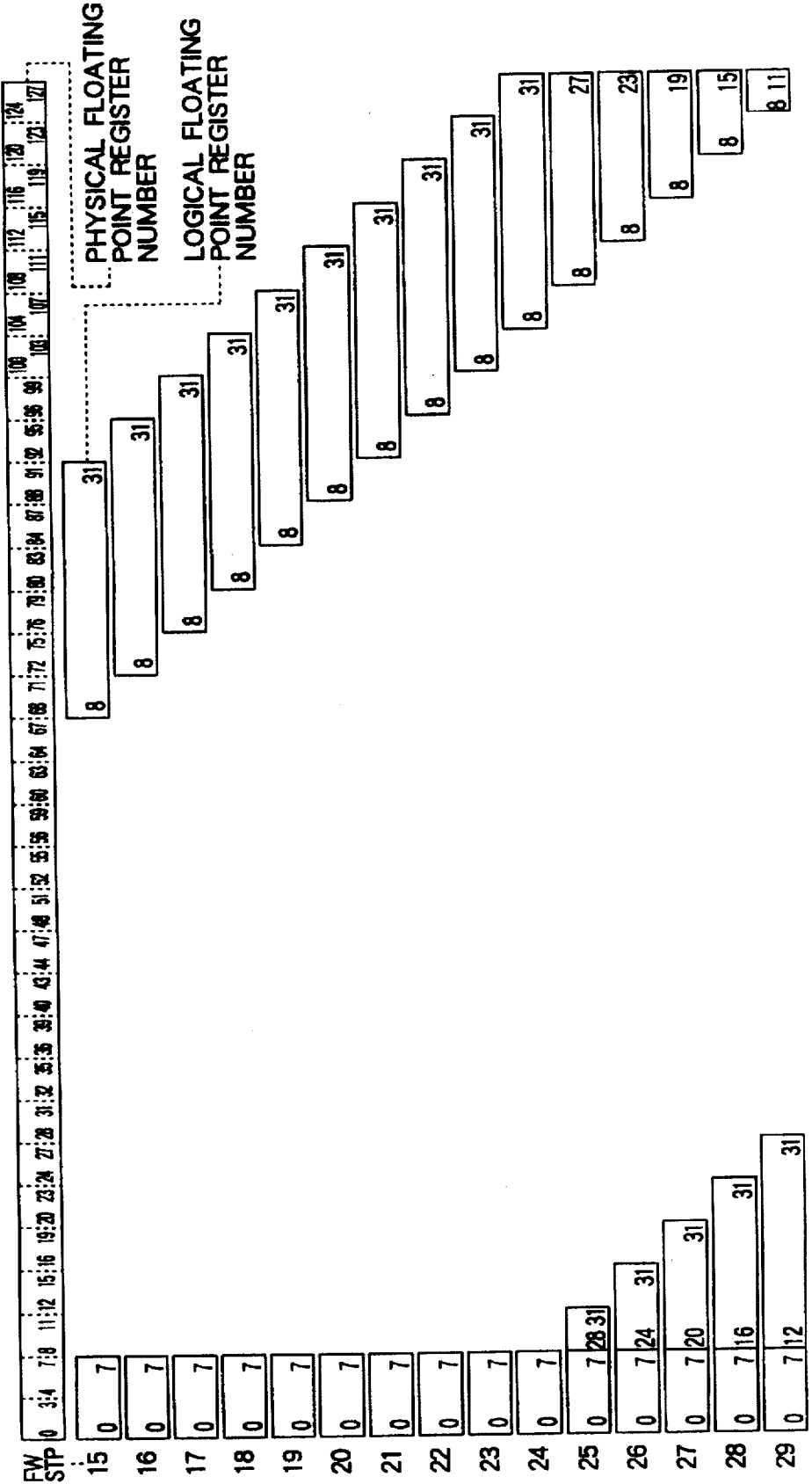

FIG. 1 shows a block diagram of an arrangement of a data processing unit in accordance with an embodiment of the present invention, and FIG. 2 shows diagrams for explaining instructions newly added in the present invention. The data processing unit shown in FIG. 1 includes an instruction processing unit 10, a memory control unit 20, and a main memory 30. The instruction processing unit 10 has an instruction register 101, an instruction controller 102, a group of general registers 103, a general calculator 104, a group of physical floating point registers 105, a floating point calculator 106, an address adder 107, a cache 108, a main memory access controller 109, a window start pointer register 110, a window start pointer valid register 111, a conversion circuit 112, and a register 118 indicative of the number of global registers.

The data processing unit of FIG. 1 according to the embodiment of the present invention performs such vector calculation as already explained earlier. More specifically, the instruction processing unit 10 of the data processing unit issues and executes an instruction, the main memory 30 thereof stores therein instructions and data to be executed by the instruction processing unit 10, and the memory control unit 20 thereof controls data transfer between the instruction processing unit 10 and main memory 30.

More in detail, in the instruction processing unit 10, the instruction register 101 holds therein an instruction to be executed, the instruction controller 102 decodes the contents of the instruction register 101 and performs control over the execution of the instruction, the general register group 103 hold therein data necessary for general calculation and address calculation, the general calculator 104 executes the general calculation designated by the instruction, the physical floating point register group 105 holds therein data necessary for floating point calculation, the floating point calculator 106 performs the floating point calculation designated by the instruction, the address adder 107 calculates a main memory address to make access to data within the main memory 30, the cache 108 holds therein main memory data read out from the memory control unit 20, the main memory access controller 109 controls the reading operation of the main memory data from the memory control unit 20 in accordance with the retrieval result of the cache 108, the window start pointer register 110 stores a window start pointer therein, the window start pointer valid register 111 indicates that the window start pointer is valid, the global register number mode register 118 indicates the number of global registers, a signal 115 indicates the number of the logical floating point register designated by the instruction, a signal 117 indicates the value of a v field of a window start pointer set instruction, and the conversion circuit 112 converts the logical floating point register number to a physical floating point register number in accordance with the above equations (2) and (3) with use of the value of the window start pointer register 110, signal 115 and the value of the global register number mode register 118.

The conversion circuit 112 has a function of adding the value of the signal 117 indicative of the value of the v field of the window start pointer set instruction to the value of the window start pointer register 110. The stored data of the global register number mode register 118 may indicate the number of global registers or may indicate a code (for example, the value '1' represents the global register number of '4') indicative of the number of global registers.

A plurality of instructions (3 instructions in this example) are stored in the instruction register 101 so that the instruction controller 102 can decode and execute the plurality of instructions (3 instructions in this example) at the same time. Further, it is assumed that the main memory access controller 109 can execute the loading and storing operation at the same time. For this reason, the address adder 107 can perform address adding operation over the load and store instructions at the same time.

In the data processing unit of FIG. 1 in accordance with the embodiment of the present invention, such three instructions as shown in FIGS. 2A to 2C are newly additionally provided. More specifically, FIG. 2A shows a window start pointer set instruction, FIG. 2B shows a floating point register pre-load instruction, and FIG. 2C shows a floating point register post-store instruction.

FIG. 2A shows a format of the window start pointer set instruction in which an instruction code indicates that the instruction is the window start pointer set instruction. In the instruction, symbol u designates that either one of the following operations (i) and (ii) is to be executed. Symbol v designates the value set at the window start pointer register (i) when u=0 and designates the value to be added to the window start pointer register (ii) when u=1. In this connection, the addition is carried out with use of (mr-mg)/sp as a modulo. In other words, in accordance with the embodiment of the present invention, since mr=128, mg=8, sm=7 and q=5, the addition result becomes 0 when v=1.

FIG. 2B shows a format of the floating point register pre-load instruction, in which an instruction code indicates that the instruction is the floating point register pre-load instruction. A floating point register (FR) number, which comprises 7 bits, indicates a logical floating point register number r for which the data is stored within the main memory. A physical floating point register number corresponding to the logical floating point register number r is <FWSTP,r> expressed by the equations (2) and (3) using the window start pointer FWSTP. A general register (GR) number indicates the number of a general register in which a main memory address is stored for reading out the data from the main memory. An increment value indicates a value to be applied to the general register after execution of reading with use of the instruction.

FIG. 2C shows a format of the floating point register post-store instruction, in which an instruction code indicates that the instruction is the floating point register post-store instruction. A floating point register (FR) number, which comprises 7 bits, indicates a logical floating point register number r for which the data is read out. A physical floating point register number corresponding to the logical floating point register number r is <FWSTP,r> expressed by the equations (2) and (3) using the window start pointer FWSTP. A general register (GR) number indicates the number of a general register in which a main memory address is stored for storing in the main memory. An increment value indicates a value to be applied to the general register after execution of writing with use of the instruction.

Explanation will next be made as to the operation of the embodiment of the present invention of FIG. 1 based on the aforementioned instructions. Explanation will first be directed to the window start pointer set instruction.

In FIG. 1, when the instruction is received at the instruction register 101, the instruction is decoded at the instruction controller 102. As a result of the decoding, when the instruction is determined to be a window start pointer set instruction, u in the instruction is checked. When (i) u=0, v designated in the instruction is set at the window start pointer register 110. When (ii) u=1, v designated in the instruction is sent to the conversion circuit 112 as the signal 117 to be added therein to the value of the window start pointer register 110, and the addition result is set in the window start pointer register 110.

Explanation will then be made as to the floating point register pre-load instruction.

When the instruction is received at the instruction register 101, the instruction is decoded at the instruction controller 102. As a result of the decoding, when the instruction is determined to be a floating point register pre-load instruction, the address adder 107 sets the contents of the general register indicated by the general register number designated in the instruction to be a main memory address. The main memory access controller 109 then retrieves the cache 108 on the basis of the main memory address. The presence of desired data in the cache 108 causes the main memory access controller 109 to transfer the data from the cache; whereas, the absence thereof causes the controller 109 to read out the data from the main memory 30 and transfer it.

The transferred data is stored one of the physical floating point register group 105. In this case, the number of the physical floating point register in which the data is to be stored is determined by the conversion circuit 112 in the following manner.

That is, the floating point register number designated in the instruction is the logical floating point register number r expressed in 7 bits, <FWSTP,r> is calculated in accordance with the equations (2) and (3) using the value of the window start pointer register 110 as FWSTP and is used as the physical floating point register number. After starting of the transferring operation, the general calculator 104 adds the increment value to the value of the general register.

Next, the floating point register post-store instruction will be explained.

When the instruction is received at the instruction register 101, the instruction is decoded at the instruction controller 102. As a result of the decoding, the instruction is determined to be the floating point register post-store instruction, the address adder 107 sets the contents of the general register indicated by the general register number designated in the instruction as a main memory address at which the data is to be stored in the main memory. The data is then read out from one of the physical floating point register group 105. In this case, the number of the physical floating point register from which the data is to be read out is determined by the conversion circuit 112 in the following manner.

That is, the floating point register number designated in the instruction is the logical floating point register number r expressed in 7 bits, <FWSTP,r> is calculated in accordance with the equations (2) and (3) with use of the value of the window start pointer register 110 as the FWSTP and is used as the physical floating point register number. The main memory access controller 109 retrieves the cache 108. If a copy of the data stored in the main memory 30 at the main memory address is present in the cache, then the main memory access controller 109 replaces the data by the read data. Otherwise, the main memory access controller stores the read data in the main memory address of the main memory 30 via the memory control unit 20 without operating the cache. After starting of the data transferring operation, the general calculator 104 adds the increment value to the value of the general register.

For general floating point instructions, i.e., for instructions using the floating point registers other than the floating point register pre-load and post-store instructions, when the window start pointer valid register 111 is "1", the logical floating point register number r is converted by the conversion circuit 112 to a physical floating point register number expressed by <FWSTP,r> in accordance with the equations (2) and (3) using the value of the window start pointer register 110 as the FWSTP to look up the physical floating point register indicative of the converted physical floating point register number.

For all the instructions looking up the floating point registers, when the window start pointer valid register t11 is "1", such an instruction causes the conversion circuit 112 to convert the logical floating point register number to a physical floating point register number; whereas, when the window start pointer valid register 111 is "0", such an instruction causes the conversion circuit 112 not to perform such a conversion, so that the logical floating point register number is used as the physical floating point register number as it is to look up the physical floating point register indicative of the physical floating point register number.

In this connection, unoccupied bits in existing registers in which control information of the data processing system is to be stored may be allocated to the window start pointer valid register 111 and global register number mode register 118, and instructions for storing values in these registers are used to set the values.

In accordance with the embodiment of the present invention, the window start pointer set instruction, floating point register pre-load instruction and floating point register post-store instruction are activated and general floating point instructions (i.e., ordinary instructions) are activated under control of the window start pointer, as mentioned above.

In the foregoing embodiment of the present invention, such a program as shown in FIGS. 9 and 10 can be realized and thus vector calculation can be executed at a high speed as already explained above.

In this connection, the computer to be employed in the present invention may such a superscalar processor as capable of executing the load or store instruction and the arithmetic instruction in parallel, i.e., as incapable of executing the load and store instructions at the same time. In other words, a superscalar processor lower in performance than the aforementioned superscalar processor may be employed. This case is different from the above case in the following respects.

It is assumed that a plurality of instructions (2 instructions in this example) are stored in the instruction register 101 and the instruction controller 102 can decode and execute the plurality of instructions (2 instructions in this example) at the same time. It is also assumed that the main memory access controller 109 can execute any one of the loading and storing operations at a time. To this end, it is assumed the address adder 107 can any one of the address addition of the load instruction and the address addition of the store instruction at a time.

The operation of the window start pointer set instruction and floating point register pre-load and post-store instructions is substantially the same as that of the aforementioned case.

In accordance with the foregoing embodiment of the present invention, the floating point register number in the instruction is converted to a different physical floating point register number by changing the window start pointer and the floating point register number in the instruction so that access to a greater number of physical registers than registers accessible by the ordinary instruction can be made without changing the architecture of the data processing unit. As a result, such a program as shown in FIGS. 9 and 10 can be realized, deterioration in the performance of the data processing unit caused by the fact that the execution of the instruction is kept to wait by the collision of registers can be prevented, whereby the high speed execution of the program can be realized.

In particular, in the foregoing embodiment of the present invention, it will be seen from the program of FIGS. 9 and 10 that, in such vector calculation as scientific and technological calculation based on the repetitive loop of a string of instructions, when the window used for each instruction is changed and when the processing of the i-th element is carried out by loading the i-th element of the operand vector by the floating point pre-load instruction in the (i-nk)-th loop and by storing the calculation of the i-th loop and the calculation result of the result storing vector to the i-th element by the floating point post-store instruction in the (i+nm)-th loop (where nk and nm represent integers capable of being specified by the program), distances between the loading, calculating and storing operations on the instruction string with respect to a piece of data can be made large and thus the reduction of the performance caused by the influences of the data read time and calculation execution time can be prevented.

In accordance with another embodiment of the present invention, when the floating point register preload instruction and the floating point register post-store instruction are used and when the physical floating point register number to load/store data can be freely determined by the floating point register number in the instruction, the present invention can flexibly cope with variations in the data read time and calculation time.

Further, in accordance with yet another embodiment of the present invention, when the window pointer register width is changed, the window cut width can be freely changed, thereby realizing flexible programming. When the number mg of global registers is made variable, the present invention can be flexibly applied to such an application that has various sorts of loop invariants.

Further, in accordance with the embodiment of the present invention, since only a single quantity of the floating point register number is used to specify the physical floating point register in the floating point register pre-load and post-store instructions, the programming can be facilitated.

As has been explained in the foregoing, in accordance with the present invention, the floating point register number in the ordinary instruction can be converted to a different physical floating point register number by changing the window start pointer, whereby a greater number of physical floating point registers than the floating point registers accessible by the ordinary instruction can be accessed without changing the architecture of the data processing unit.

Further, in accordance with the present invention, since access to all the physical floating point registers can be realized by changing the physical floating point register number of the physical floating point register pre-load and post-store instructions, there can be prevented a reduction in the performance caused by the fact that the data read time and the collision between registers causes the execution of the instruction to be kept to wait, whereby the program can be executed at a high speed.

What is claimed is:

1. A data processing unit comprising:
   a main memory; and
   an instruction execution unit for executing load instructions, store instructions and arithmetic instructions each having at least one register designation field of a first length for use with data held in said main memory, said instruction execution unit comprising:
   registers called physical registers larger in number than registers addressable by said register designation field of the first length,
   a register called a window start pointer register having a plurality of bits,
   a register called a window start pointer valid register,
   a conversion circuit which, when the window start pointer valid register has a value of 1, converts a register number in the instruction to a physical register number and changes a pattern of said conversion in accordance with a value of said window start pointer register, and
   means for executing (i) a window pointer set instruction for setting a value of the window start pointer register, (ii) a register pre-load instruction having a register designation field of a second length for converting a register number in the register designation field to a physical register number by the conversion circuit according to the value of said window start pointer register and for storing data from the main memory to the physical register designated by the physical register number, (iii) a register post-store instruction having a register designation field of a second length for converting a register number in the register designation field to a physical register number by the conversion circuit according to the value in said window start pointer register and for storing data from the physical register indicative of said physical register number to the main memory, and
   wherein said register number specified by the register designation field in said load instruction having the register designation field of the first length, said store instruction having the register designation field of the first length, and said arithmetic instruction having the register designation field of the first length is converted by the conversion circuit to a physical register number according to the value of said window start pointer register to refer to the physical register indicative of said physical register number,
   wherein conversion from the register number in said instruction to said physical register number is conversion to the same said physical register number called a global register number regardless of the value in said window start pointer register,
   wherein, when a local register number is defined as a value corresponding to a subtraction of the number of registers called global registers numbered by said global register numbers from the number of said physical registers, wherein the number of bits in said window start pointer register is defined as a window start pointer register width, an integer value greater than or equal to said window start pointer register width and selected to be determinative of the number of physical registers is defined as a pointer width maximum value, and 2 to the power of a value corresponding to subtraction of said window start pointer register width from said pointer width maximum value is defined as a window cut width, and wherein the register number other than the register number numbered by the global register number in said register pre-load and post-store instructions and said load, stored and arithmetic instructions each having said register designation field of the first length except for said register pre-load and post-store instructions is converted to the physical register number expressed by a value corresponding to addition of (i) the register number in the instruction to (ii) a product of the value of said window start pointer register and said window cut width.

2. A data processing unit as set forth in claim 1, wherein, at the time of reading the main memory data, said register pre-load instruction does not change contents of a cache serving as a buffer memory device for temporarily holding part of contents of said main memory when said main memory data is not registered in said cache, and wherein at the time of writing data in the main memory, said register post-store instruction does not change the contents of said cache when the main memory data of an associated main memory address is not registered in the cache.

3. A data processing unit comprising:
   a main memory; and
   an instruction execution unit for executing load instructions, store instructions and arithmetic instructions each having at least one register designation field of a first length for use with data held in said main memory, said instruction execution unit comprising:
   registers called physical registers larger in number than registers addressable by said register designation field of the first length,
   a register called a window start pointer register having a plurality of bits,
   a register called a window start pointer valid register,
   a conversion circuit which, when the window start pointer valid register has a value of 1, converts a register number in the instruction to a physical register number and changes a pattern of said conversion in accordance with a value of said window start pointer register,
   means for executing (i) a window pointer set instruction for setting a value of the window start pointer register, (ii) a register pre-load instruction having a register designation field of a second length for converting a register number in the register designation field to a physical register number by the conversion circuit according to the value of said window start pointer register and for storing data from the main memory to the physical register designated by the physical register number, (iii) a register post-store instruction having a register designation field of a second length for converting a register number in the register designation field to a physical register number by the conversion circuit according to the value in said window start pointer register and for storing data from the physical register indicative of said physical register number to the main memory, and wherein said register number specified by the register designation field in said load instruction having the register designation field of the first length, said store instruction having the register designation field of the first length, and said arithmetic instruction having the register designation field of the first length is converted by the conversion circuit to a physical register number according to the value of said window start pointer register to refer to the physical register indicative of said physical register number, wherein conversion from the register number in said instruction to said physical register number is conversion to the same said physical register number called a global register number regardless of the value in said window start pointer register, wherein, when a local register number is defined as a value corresponding to a subtraction of the number of registers called global registers numbered by said global register numbers from the number of said physical register, wherein the number of bits in said window start pointer register is defined as a window start pointer register width, an integer value greater than or equal to said window start pointer register width and selected to be determinative of the number of physical registers is defined as a pointer width maximum value, and 2 to the power of a value corresponding to subtraction of said window start pointer register width from said pointer width maximum value is defined as a window cut width and wherein the register number other than the register number numbered by the global register number in said register pre-load and post-store instructions and said load, store and arithmetic instructions each having said register designation field of the first length except for said register pre-load and post-store instructions is converted to the physical register number expressed by a value corresponding to addition of (i) the number of global registers to (ii) addition of (a) subtraction of the number of global registers from the register number in the instruction to (b) a product of the value of said window start pointer register and said window cut width to with use of (c) a value of subtraction of the number of global registers from the number of physical registers as a modulus.

4. A data processing unit as set forth in claim 3, further comprising a global register number mode register indicative of the number of registers numbered by said global register number, the conversion pattern of said conversion circuit is changed by a value of said global register number mode register, a value is set in said global register number mode register on a software basis so that the number of the registers numbered by the global register number in the instruction is made variable on the software basis.

5. A data processing unit as set forth in claim 3, wherein, at the time of reading the main memory data, said register pre-load instruction does not change contents of a cache as a buffer memory device for temporarily holding part of contents of said main memory when said main memory data is not registered in said cache; while, at the time of writing data in the main memory, said register post-store instruction does not change the contents of said cache when the main memory data of an associated main memory address is not registered in the cache.

6. A data processing unit as set forth in claim 3, wherein, at the time of reading the main memory data, said register pre-load instruction does not change contents of a cache serving as a buffer memory device for temporarily holding part of contents of said main memory when said main memory data is not registered in said cache, and wherein, at the time of writing data in the main memory, said register post-store instruction does not change the contents of said cache when the main memory data of an associated main memory address is not registered in the cache.

7. A data processing unit comprising:

a main memory; and an instruction execution unit for executing load instructions, store instructions and arithmetic instructions each having at least one register designation field of a first length for use with data held in said main memory, said instruction execution unit further comprising:

registers called physical registers larger in number than registers addressable by said register designation field of the first length, a register called a window start pointer register having a plurality of bits, a register called a window start pointer valid register, and a conversion circuit which, when the window start pointer valid register has a value of 1, converts a register number in the instruction to a physical register number and changes a pattern of said conversion in accordance with a value of said window start pointer register, and means for executing (i) a window pointer set instruction for setting a value of the window start pointer register, said window start pointer register having a register designation field of a second length, a register number specified by the register designation field in the instruction being converted by said conversion circuit to a physical register number according to the value of said window start pointer register, (ii) a register pre-load instruction having a register designation field of a second length, a register number specified by the register designation field in the instruction being converted by said conversion circuit to a physical register number according to the value of said window start pointer register for storing the main memory data in the physical register indicative of said physical register number, and (iii) a register post-store instruction having a register designation field of the second length, a register number specified by the register designation field of the instruction being converted by the conversion circuit to a physical register number according to the value of said window start pointer register for storing data from the physical register indicative of said physical register number to the main memory, wherein the register number specified by the register designation field in said load instruction of the register designation field of the first length, said store instruction having the register designation field of the first length, and said arithmetic instruction having the register designation field of the first length is converted by said conversion circuit to a physical register number according to the value of said window start pointer register to refer to the physical register indicative of said physical register number, and further the registers numbered by said instruction and said physical register are exclusive registers called floating point registers for storing floating points, wherein conversion from the register number in said instruction to said physical register number is conversion to the same said physical register number called a global register number regardless of the value of said window start pointer register, wherein, when a local register number is defined as a value corresponding to subtraction of the number of registers called global registers numbered by said global register numbers from the number of said physical registers, wherein the number of bits in said window start pointer register is defined as a window start pointer register width, an integer value greater than or equal to said window start pointer register width and selected to be determinative of the number of physical registers is defined as a pointer width maximum value, and 2 to the power of a value corresponding to subtraction of said window start pointer register width from said pointer width maximum value is defined as a window cut width, and wherein the register number other than the register number numbered by the global register number in said register pre-load and post-store instructions and said load, store and arithmetic instructions each having said register designation field of the first length except for said register pre-load and post-store instructions is converted to the physical register number expressed by a value corresponding to addition of (i) the register number in the instruction to (ii) a product of the value of said window start pointer register and said window cut width.

8. A data processing unit as set forth in claim 7, wherein, at the time of reading the main memory data, said register pre-load instruction does not change contents of a cache as a buffer memory device for temporarily holding part of contents of said main memory when said main memory data is not registered in said cache, and wherein at the time of writing data in the main memory, said register post-store instruction does not change the contents of said cache when the main memory data of an associated main memory address is not registered in the cache.

9. A data processing unit comprising:

a main memory; and an instruction execution unit for executing load instructions, store instructions and arithmetic instructions each having at least one register designation field of a first length for use with data held in said main memory, said instruction execution unit further comprising:

registers called physical registers larger in number than registers addressable by said register designation field of the first length, a register called a window start pointer register having a plurality of bits, a register called a window start pointer valid register, and a conversion circuit which, when the window start pointer valid register has a value of 1, converts a register number in the instruction to a physical register number and changes a pattern of said conversion in accordance with a value of said window start pointer register, and means for executing (i) a window pointer set instruction for setting a value of the window start pointer register, (ii) a register pre-load instruction having a register designation field of a second length, a register number specified by the register designation field in the instruction being converted by said conversion circuit to a physical register number according to the value of said window start pointer register for storing the main memory data in the physical register indicative of said physical register number, and (iii) a register post-store instruction having a register designation field of the second length, a register number specified by the register designation field of the instruction being converted by the conversion circuit to a physical register number according to the value of said window start pointer register for storing data from the physical register indicative of said physical register number to the main memory, wherein the register number specified by the register designation field in said load instruction of the register designation field of the first length, said store instruction having the register designation field of the first length, and said arithmetic instruction having the register designation field of the first length is converted by said conversion circuit to a physical register number according to the value of said window start pointer register to refer to the physical register indicative of said physical register number, and further the registers numbered by said instruction and said physical register are exclusive registers called floating point registers for storing floating points, wherein conversion from the register number in said instruction to said physical register number is conversion to the same said physical register number called a global register number regardless of the value of said window start pointer register, wherein, when a local register number is defined as a value corresponding to subtraction of the number of registers called global registers numbered by said global register numbers from the number of said physical registers, the number of bits in said window start pointer register is defined as a window start pointer register width, an integer value greater than or equal to said window start pointer register width and selected to be determinative of the number of physical registers is defined as a pointer width maximum value, and 2 to the power of a value corresponding to subtraction of said window start pointer register width from said pointer width maximum value is defined as a window cur width wherein the register number other than the register number numbered by the global register number in said register pre-load and post-store instructions and said load, store and arithmetic instructions each having said register designation filed of the first length except for said register pre-load and post-store instructions is converted to the physical register number expressed by a value corresponding to addition of (i) the number of global registers to (ii) addition of (a) subtraction of the number of global registers from the register number in the instruction to (b) a product of the value of said window start pointer register and said window cut width to with use of (c) a value of subtraction of the number of global registers from the number of physical registers as a modulus.

10. A data processing unit as set forth in claim 9, further comprising a global register number mode register indicative of the number of registers numbered by said global register number, wherein the conversion pattern of said conversion circuit is changed by a value of said global register number mode register, a value is set in said global register number mode register on a software basis so that the number of the registers numbered by the global register number in the instruction is made variable on the software basis.

11. A data processing unit as set forth in claim 9, wherein, at the time of reading the main memory data, said register pre-load instruction does not change contents of a cache as a buffer memory device for temporarily holding part of contents of said main memory when said main memory data is not registered in said cache, wherein at the time of writing data in the main memory, said register post-store instruction does not change the contents of said cache when the main memory data of an associated main memory address is not registered in the cache.

12. A data processing unit as set forth in claim 9, wherein, at the time of reading the main memory data, said register pre-load instruction does not change contents of a cache as a buffer memory device for temporarily holding part of contents of said main memory when said main memory data is not registered in said cache, and wherein at the time of writing data in the main memory, said register post-store instruction does not change the contents of said cache when the main memory data of an associated main memory address is not registered in the cache.

13. A data processing unit as set forth in claim 1, wherein said pointer width maximum value equals $Log_2 N_1$, where $N_1$ equals the number of physical registers, when the number of physical registers is any power of 2, and equals an integer number larger than but approximately near $Log_2 N_2$, where $N_2$ equals the number of physical registers, when the number of physical registers is not any power of 2.

* * * * *